(12) United States Patent
Tamura

(10) Patent No.: US 7,003,537 B1
(45) Date of Patent: Feb. 21, 2006

(54) APPARATUS AND METHOD TO COMPUTE IN JACOBIAN OF HYPERELLIPTIC CURVE DEFINED OVER GALOIS FIELD OF CHARACTERISTIC 2

(75) Inventor: Tetsuya Tamura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,847

(22) Filed: Jan. 14, 2000

(30) Foreign Application Priority Data

Jan. 14, 1999 (JP) .................................. 11-007384

(51) Int. Cl.
*G06F 7/00* (2006.01)
(52) U.S. Cl. ...................................... 708/492
(58) Field of Classification Search ........ 708/491–492, 708/650, 653–656; 380/28, 30
See application file for complete search history.

(56) References Cited

U.S. PATENT DOCUMENTS 6,377,969 B1 * 4/2002 Orlando et al. ............. 708/492

* cited by examiner

*Primary Examiner*—Tan V. Mai
(74) *Attorney, Agent, or Firm*—Whitham, Curtis & Christofferson, P.C.; Stephen C. Kaufman

(57) ABSTRACT

To implement an operation in Jacobian with improved computation complexity, the sum is computed of a divisor $D_1$=g.c.d. $(a_1(x), y-b_1(x))$ and a divisor $D_2$=g.c.d. $(a_2(x), y-b_2(x))$ on Jacobian of a hyperelliptic curve $y^2+y=f(x)$ defined over $GF(2^n)$ by: storing $a_1(x)$, $a_2(x)$, $b_1(x)$ and $b_2(x)$; and calculating $q(x)=s_1(b_1(x)+b_2(x))$ mod $a_2(x)$ by using $s_1(x)$ in $s_1(x)a_1(x)+s_2(x)a_2(x)=1$ in case of $GCD(a_1(x), a_2(x))=1$ where GCD denotes a greatest common polynomial. Thus, a new function $q(x)$ is provided so as to reduce the entire computational complexity and the hardware size. Moreover, in the case of $D_1=D_2$, $a_1(x)$ and $b_1(x)$ is stored; and $q(x)=Q(b_1^2(x)+f(x)$ mod $a_1^2(x), a_1(x))$ where $Q(A,B)$ is a quotient of A/B is calculated.

8 Claims, 11 Drawing Sheets

APPARATUS AND METHOD TO COMPUTE IN JACOBIAN OF HYPERELLIPTIC CURVE DEFINED OVER GALOIS FIELD OF CHARACTERISTIC 2

FIELD OF THE INVENTION

The present invention relates to an apparatus and a method for computing the sum of a divisor $D_1$=g.c.d. $((a_1(x)), (y-b_1(x)))$ and a divisor $D_2$=g.c.d. $((a_2(x)), (y-b_2(x)))$ on jacobian of a hyperelliptic curve $y^2+y=f(x)$ defined over $GF(2^n)$ (Galois Field of characteristic 2), where g.c.d. is greatest common divisor.

BACKGROUND OF THE INVENTION

This application discloses an algorithm suited for performing operation on hardware on Jacobian of a hyperelliptic curve defined over $GF(2^n)$. The following explains prerequisite knowledge required to understand the present invention.

[1] Hyperelliptic Curve and Divisor

There is a field referred to as K, and its algebraically closed field is referred to as K⁻ (K with a bar on it). A hyperelliptic curve C of genus g over K is defined by an equation of the form: $y^2+h(x)y=f(x)$. Here, h(x) is a polynomial of a degree g at most, and f(x) is a monic polynomial of degree 2g+1. Here, polynomials f and g have coefficients in K and curve C has no singular points. Also, when rational point P=(x,y) is given, its opposite point is defined as $\bar{P}=(x,-y-h(x))$. If P is infinite-point $P_\infty$, it shall be $P_\infty=\bar{P}_\infty$. Hereafter, this application assumes a case of filed $K=GF(2^n)$, h(x)=1.

A divisor D of C is a finite form sum of K⁻-points $P_1 \ldots P_r$ and given by $$D = \sum_{P_i \in C} m_i P_i$$

The degree of divisor D is defined by deg $D = \Sigma m_i$.

$$D_1 = \sum_{P_i \in C} m_i P_i$$

$$D_2 = \sum_{P_i \in C} n_i P_i$$

By defining the sum of divisors of C as $$D_1 + D_2 = \sum_{P_i \in C} (m_i + n_i) P_i$$

D(C), a set of the entire divisors of C forms an additive group which is called a divisor group. The entire divisors of degree 0 from a subgroup which is denoted $D^0(C)$. The non zero rational function h of curve C has a finite number of zeros and poles, div(h) which is a divisor of h is defined by using zeros and poles of h in $$div(h) = \sum_{P_i \in C} ord_{P_i}(h) P_i = \sum m_i P_i - \sum n_i Q_i$$

Here, $P_i$ is a zero of rational function h, $m_i$ is its multiplicity, $Q_i$ is a pole of rational function h, $n_i$ is multiplicity of poles, and $ord_{P_i}(h)$ is an order of rational function h at point $P_i$. A divisor of a non zero rational function is called a principal divisor. A set of entire principal divisors is called a principal divisor group which is denoted $D^1(C)$.

In general, since the number of zeros and the number of poles of a rational function are equal if considered including multiplicity (order), it is $D^1(C) \subset D^0(C)$. When two divisors $D_1$ (Expression 1), $D_2$ (Expression 2)$\in D^0(C)$ are given, g.c.d. $(D_1,D_2)$ of two divisors is defined by $\Sigma \min(m_i,n_i)P_i-(\Sigma \min(m_i,n_i)P_\infty)$. Also, from the expression, it is apparently g.c.d. $(D_1,D_2) \subset D^0(C)$.

[2] Definition of Jacobian

Jacobian is defined to be the quotient group $D^0(C)/D^1(C)$ about a group (see "Number Theory 2" by Yoshihiko Yamamoto, Iwanami Shoten (1996)). This is denoted as J(C). If $D_1,D_2 \in D^0(C)$ and $D_1-D_2 \in D^1(C)$, $D_1$, $D_2$ are called linearly equivalent. $\forall D \in D^0(C)$ can be transformed to divisor $D_1(m_i \geq 0)$ which satisfy the following conditions.

$$D_1 = \sum_{P_i \in C} m_i P_i - \left(\sum_{P_i \in C} m_i\right) P_\infty$$

(1) $D_1 \sim D$
(2) If $P_i$ appears in $D_1$, then the point $\bar{P}_i$ does not appear as one of $P_j (j \neq i)$.
(3) When $\bar{P}_i = P$, $m_i = 1$ at most.

Such a divisor is called a semi-reduced. An element of a Jacobian is uniquely represented by such a semi-reduced divisor subject to the additional condition that $$\sum_{P_i \in C} m_i \leq g$$

Such a divisor is called a reduced divisor.

Any semi-reduced divisor D can be uniquely represented by D=g.c.d. $((a(x)), (y-b(x)))$. Here, $a(x)=y-\Pi_i(x-x_i)^{m_i}$ and b(x) is the unique polynomial of degree<deg (a) satisfying $b(x_i)=y_i$. A necessary and sufficient condition for D to be a reduced divisor is deg $a \leq g$. Hereafter, g.c.d. $((a(x)),(y-b(x)))$ is denoted as div(a,b) following "Computing in the Jacobian of a Hyperelliptic Curve," D. G. Cantor, Math. Of Comp, 48, No. 177, pp. 95–101, (1987). In addition, divisor D is regarded as a pair of polynomials a and b hereafter.

The discrete logarithm problem on $J(C;GF(2^n))$ is the problem of determining an integer m such that $D_1=mD_2$ for $D_1, D_2 \in J(C;GF(2^n))$.

[3] Security Conditions of Jacobian

The conditions which Jacobian $J(C;GF(2^n))$ must satisfy in order to construct a secure hyperelliptic curve cryptosystem are as follows according to "Construction and Implementation of a Secure Hyperelliptic Curve CryptoSystem," Yasuyuki Sakai, Yuichi Ishizuka and Kouichi Sakurai, SCIS'98–10.1.B, January, 1998, etc.

C1 $\#J(C;GF(2^n))$ is divisible by a large prime number.
C2 $(2^n)^k-1$, $k<(\log 2^2)^2$ is indivisible by the largest prime factor of $\#J(C;GF(2^n))$.
C3 $2g+1<\log 2^n$

[4] Algorithm for Computing in Jacobian

Addition in Jacobian is, for $D_1, D_2 \in J(C; GF(2^n))$, to find a reduced divisor D' which is a linearly equivalent to $D_1+D_2$. According to the aforementioned article of Cantor and, "Hyperelliptic Curve Cryptosystems," N. Koblitz, Journal of Cryptology, 1, pp. 139–150, (1989), an algorithm for addition consists of two procedures. In this procedure 1, for input $D_1=\text{div}(a_1,b_1)$ and $D_2=\text{div}(a_2,b_2)$, semi-reduced divisor D is found, such that $D_1+D_2 \sim D$ ($D=\text{div}(a,b)$). In procedure 2, with this D as input, reduced divisor D' is found, such that $D \sim D'$ ($D'=\text{div}(a',b')$, deg b'<deg a', deg $a' \leq g$). These procedures are as follows, if the hyperelliptic curve is $y^2+h(x)y=f(x)$.

Procedure 1

| Input | $a_1, b_1$ | $D_1 = \text{div}(a_1, b_1)$ |
|---|---|---|
|  | $a_2, b_2$ | $D_2 = \text{div}(a_2, b_2)$ |
| Output | a, b |  |

(1) $s_1(x), s_2(x), s_3(x)$ which satisfy $d=s_1 a_1+s_2 a_2+s_3(b_1+b_2+h)$ are calculated where a greatest common divisor (GCD) of polynomials $a_1(x), a_2(x), b_1(x)+b_2(x)+h(x)$ is $d=d(x)$.

(2) a(x), b(x) are calculated based on the following expression.

$$a = a_1 a_2 / d^2$$

$$b = (s_1 a_1 b_2 + s_2 a_2 b_1 + s_3(b_1 b_2 + f))/d \bmod a$$

Procedure 2

| Input | a, b |  |
|---|---|---|
| Output | a', b' | D to D' |

(1) a'(x) and b'(x) are calculated based on the following expression.

```
a' = (f - hb - b²)/a
b' = (-h - b) mod a'
(2) if (deg a' > g) then
       a = a'
       b = b'
       goto (1)
    else end
```

In particular, procedure 1 can be simplified as follows in the case of doubling.

Procedure 1

$$a = a_1^2$$

$$b = (b_1^2 + f) \bmod a$$

go to procedure 2 (1).

If it is calculated as is with the above algorithm, there is a drawback that operation of a polynomial with a degree 2g becomes necessary leading to increased computation complexity.

SUMMARY OF THE INVENTION

An object of the present invention is to implement computation in Jacobian with less computation complexity.

Another object of the present invention is to make it possible to implement computation in Jacobian with a smaller hardware size.

As described in the article quoted above, Koblitz proposed a cryptosystem using the discrete logarithm problem on Jacobian of a hyperelliptic curve of which genus is larger than 1. However, it has been shown by Frey that Koblitz's hyperelliptic Cryptosystem using g=2 curve isn't secure. (see "A Remark Concerning m-Divisibility and the Discrete Logarithm in the Divisor Class Group of Curves," G. Frey, H. G. Ruck, Math. Of Comp, 62, No. 206, pp. 865–874, (1994)). As to a curve of which genus is 3 or more, several curves which seem to be secure have been found (see "Construction and Implementation of a Secure Hyperelliptic Curve Cryptosystems," Yasuyuki Sakai, Yuichi Ishizuka and Kouichi Sakurai, SCIS'98–10.1.B, January, 1998; "A Hyperelliptic Curve Where Jacobian Becomes Almost Prime on a Finite Field of a Small Characteristic," Izuru Kitamura, SCIS' 98–7.1.A, January, 1998; and "Public Key Cryptosystems with Cab Curve (1)," S. Arita, IE ICE ISEC97–54 pp. 13–23 (1997), etc.).

In general, calculations in $GF(2^n)$ are suited for hardware implementation for the following reasons. (1) Addition and multiplication can be performed at high speed on a relatively small-scale piece of hardware. (2) Square operation can be easily performed. (3) Inverse can be operated at high speed by a method proposed by Ito-Tsujii ("A Fast Algorithm for Computing Multiplicative Inverse in GF(2m) Using Normal Bases," T. Itoh, S. Tsujii, Inform. and Comput., vol. 83, No. 1, pp. 171–177, (1989)). Moreover, a hyperelliptic curve cryptosystem is more suited to hardware implementation than an elliptic curve cryptosystem because the ground field to be used can be smaller than that for an elliptic curve cryptosystem, and the above-mentioned calculation for acquiring a greatest common divisor of polynomial in Cantor's algorithm can be efficiently performed by having multiple multipliers run in parallel. Accordingly, in the present invention, the computational complexity and the hardware size are reduced by improving Cantor's algorithm.

Therefore, it has the following characteristics. Namely, an apparatus for computing the sum of a divisor $D_1=\text{g.c.d.}((a_1(x)),(y-b_1(x)))$ and a divisor $D_2=\text{g.c.d.}((a_2(x)),(y-b_2(x)))$ on Jacobian of a hyperelliptic curve $y^2+y=f(x)$ defined over $GF(2^n)$ (g.c.d. is defined in above) comprises: means for storing $a_1(x), a_2(x), b_1(x)$ and $b_2(x)$; and means for calculating $q(x)=\{s_1(x)(b_1(x)+b_2(x))\} \bmod a_2(x)$ by using $s_1(x)$ in $s_1(x)a_1(x)+s_2(x)a_2(x)=1$ in case of $GCD(a_1(x), a_2(x))=1$ where GCD denotes a greatest common divisor of polynomials. Thus, a new function q(x) is introduced so as to reduce the entire computational complexity and the hardware size. While examples where a hyperelliptic curve is $y^2+y=x^7$ are described in detail in the embodiments, this q(x) can be effectively used even in the case that it is other hyperelliptic curves. Moreover, since the group operation is commutative, the same sum can be acquired by using q(x) obtained by exchanging $a_1, b_1$ and $s_1$ for $a_2, b_2$ and $s_2$. Hereafter, it may be explained by using only one of the pair in order to avoid complication, yet it has the same meaning if exchanged. $q(x)=\{s_1(x)(b_1(x)+b_2(x))\} \bmod a_2(x)$ can be replaced by $q(x)=\{s_2(x)(b_1(x)+b_2(x))\} \bmod a_1(x)$.

Moreover, in the case of $D_1=D_2$, means for storing $a_1(x)$ and $b_1(x)$; and means for calculating $q(x)=Q(b_1^2(x)+f(x)$ mod $a_1^2(x), a_1(x)$) where $Q(A,B)$ is a quotient of A/B are provided. Thus, a separate $q(x)$ is defined.

An apparatus for calculating $a'(x)$ and $b'(x)$ of a reduced divisor $D'$=g.c.d. (($a'(x)$),($y-b'(x)$)) which is a linearly equivalent to $D_1+D_2$ for a divisor $D_1$=g.c.d. ($a_1(x), y-b_1(x)$) and a divisor $D_2$=g.c.d. (($a_2(x)$),($y-b_2(x)$)) on Jacobian of a hyperelliptic curve $y^2+y=f(x)$ defined over $GF(2^n)$ comprises: means for calculating $q(x)=s_1(x)(b_1(x)+b_2(x))$ mod $a2(x)$ by using $s_1(x)$ in $s_1(x)a_1(x)+s_2(x)a_2(x)=1$ in case of $GCD(a_1(x),a_2(x))=1$ where GCD denotes a greatest common divisor of polynomials; means for calculating $$\alpha(x)=Q(q^2(x)a_1(x),a_2(x))+Q(f(x),a_1(x)a_4(x))$$

(or $\alpha(x)=Q(q^2(x)a_2(x), a_1(x))+Q(f(x), a_1(x)a_2(x))$) which is rendered a monic polynomial where $Q(A,B)$ is a quotient of A/B; means for calculating $\beta(x)=(q(x)a_1(x)+b_4(x)+1)$ mod $\alpha(x)$ (or $\beta(x)=(q(x)a_2(x)+b_2(x)+1)$ mod $\alpha(x)$); means for calculating $a'(x)=Q(f(x)+\beta^2(x),\alpha(x))$; and means for calculating $b'(x)=(\beta(x)+1)$ mod $a'(x)$.

On the other hand, in the case of $D_1=D_2$, it comprises: means for calculating $q(x)=Q(b_1^2(x)+f(x)$ mod $a_1^2(x)\ a_1(x))$ where $Q(A,B)$ is a quotient of A/B; means for calculating $\alpha(x)=q^2(x)+Q(f(x),a_1^2(x))$ which is rendered a monic polynomial; means for calculating $\beta(x)=(b_1^2(x)+f(x)$ mod $a_1^2(x)+1)$ mod $\alpha(x)$; means for calculating $a'(x)=Q\ (f(x)+(x)\beta(x),\alpha(x)$; and means for calculating $b'(x)=(\beta(x)+1)$ mod $a'(x)$.

While the above is an organization on the precondition of rendering as hardware, it is also possible to transform them to be implemented by a computer program, etc. In that case, the program will be stored on storage media such as a floppy disk and a CD-ROM and other storage devices.

DESCRIPTION OF THE PREFERRED EMBODIMENTS

Figure 1:
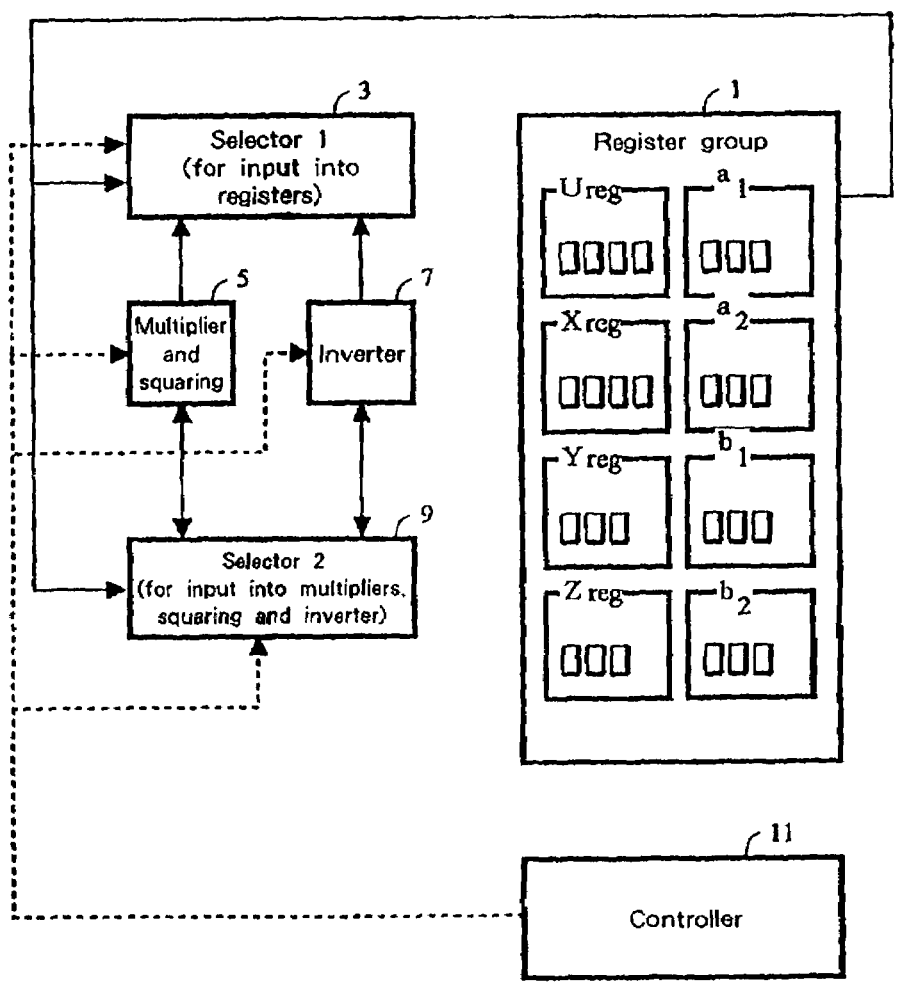
FIG. 1 is a block diagram of the entire present invention.

First, the basic algorithm of the present invention is explained.

Meanwhile, in performing an addition, a greatest common divisor of polynomials $a_1$ and $a_2$ must be acquired. However, when a ground field is large and $a_1$ and $a_2$ are the coordinates of two randomly selected elements of the Jacobian, the case $GCD(a_1,a_2)=1$ is extremely likely. Therefore, this application deal with the only case of $GCD(a_1,a_2)=1$ hereafter, since processing in the case that $a_1$ and $a_2$ have no common divisor does not greatly affect performance. In addition, the greatest common divisor of polynomial $GCD(a_1,a_2)=1$ is represented by polynomials $s_1$ and $s_2$ as $s_1(x)\ a_1(x)+s_2(x)a_2\ (x)=1$. Moreover, even in calculating in the case that they have no common divisor, generalized lemmas 1 and 2 for simplifying procedure 1 which is explained later and function $Q(u,v)$ for simplifying procedure 2 can be used.

Moreover, Euclid's algorithm is usually used for operation of procedure 1 (1) of the background art, namely to acquire polynomials $s_1, s_2$ and a greatest common divisor of polynomials. Euclid's algorithm is used for calculating an error-location polynomial or an error-evaluation polynomial, in decoding of Reed-Solomon code, etc. and it is frequently implemented. For instance, see Japanese Unexamined Patent Publication No. Hei 7-202718 or Japanese Unexamined Patent Publication No. Sho 62-122332. Accordingly, in the present invention, the process for seeking only the greatest common divisor of polynomials d of the two polynomials and $s_1$ (or $s_2$) which meets $d=s_1a_1+s_2a_2$ is handled as already calculated. It can also be calculated by using the following example of implementation (FIG. 1), for instance. Explanation of the details of actual operation is omitted, but $s_1(x)$ is output on Yreg. Also, $s_1(x)$ is normalized so that the common divisor of polynomials d equals 1.

In the case that $a_1$ and $a_2$ have no common divisor, an algorithm for the operation in Jacobian (background art) can be transformed for procedure 1 (2) and thereafter as follows.

Transformation 1 (a case of a normal addition)

```
Input a₁, a₂, b₁, b₂
Output a', b'
    a₃(x) = a₁a₂
    b₃(x) = (s₁a₁b₂ + s₂a₂b₁) mod a₃
    a₄(x) = (f + b₃ + b₃²)/a₃
    a₄(x) rendered monic (render the leading coefficient 1)
    b₄(x) = (b₃ + 1) mod a₄(x)
    while (deg a₄(x) > g) {
        a' = a₅(x) = (f + b₄ + b₄(x)²)/a₄(x)
        b' = b₅(x) = (b₄ + 1) mod a₅(x)
        a₄(x) = a'
        b₄(x) = b'
    }end
```

$f(x)=x^7$ is used for this algorithm. In procedure 2 (1) for an algorithm of the operation, the orders of a and b are reduced by 2 and thereafter the orders are reduced by 2 (or 1), which shows that a' of degree 3 or less is acquired by executing the content of the while loop once. The polynomial operated for remainder in calculation of $b_3$ is an expression of degree 7, the dividend polynomial for calculation of $a_4(x)$ is an expression of degree 10, thus requiring plenty of calculation. To reduce it, a new polynomial $q(x)=s_1(b_1+b_2)$ mod $a_2$ is introduced.

Lemma 1

The first $a_4(x)$ in transformation 1 is given by using $q(x)$ in $a_4(x)=Q(q^2a_1,a_2)$. Here, $Q(u,v)$ is a function which provides a quotient of u/v.

(Proof)

First, we show $b_3(x)=qa_1+b_1$. Note that above-mentioned assumption, $s_1a_1+s_2a_2=1$. And deg $a_1a_2>$deg $b_1$, $b_3(x)$ is calculated as follows.

$$\begin{aligned}b_3(x) &= (s_1a_1b_2 + s_2a_2b_1) \bmod a_3 \\ &= (s_1a_1b_2 + (1 + s_1a_1)b_1) \bmod a_1a_2 \\ &= (s_1a_1(b_1 + b_2)) \bmod a_1a_2 + b_1 \\ &= \{(s_1(b_1 + b_2)) \bmod a_2\} a_1 + b_1 \\ &= qa_1b_1 \quad (\#)\end{aligned}$$

Next, since a division to calculate $a_4$ is divisible, and it is $Q(b_3,a_3)=0$ from deg $b_3<$deg $a_3$, $$\begin{aligned}a_4(x) &= Q(f + b_3 + b_3^2, a_3) \\ &= Q(f,a_3) + Q(b_3^2,a_3).\end{aligned}$$

If (#) is substituted into the second term, and note $Q(b_1^2,a_3)=0$ from deg $b_1^2<$deg $a_3$, $$Q(b_3^2,a_3)=Q(q^2a_1^2+b_1^2,a_3)=Q(q^2a_1^2,a_3)$$

From this, $a_4(x)=Q(q^2a_1,a_2)+Q(f,a_3)$ Q.E.D.

If input polynomials are defined as $$a_1(x)=x^3+c_2x^2+c_1x+c_0$$

$$a_2(x)=x^3+e_2x^2+e_1x+e_0$$

$$b_1(x)=d_2x^2+d_1x+d_0$$

$$b_2(x)=f_2x^2+f_1x+f_0,$$

and $f(x)=x^7$ is used, the second term of $a_4$ becomes $Q(x^7, a_3)=x+c_2+e_2$. From this, if transformation 1 is rewritten by using $q(x)$, it becomes the following algorithm of the present invention.

Algorithm of the Present Invention (Addition)

```
Input a₁, a₂, b₁, b₂
Output a', b'
    q(x) = s₁(b₁ + b₂) mod a₂
    a₄(x) = Q(q²a₁,a₀) + x + c₂ + e₂
    a₄(x) ← a₄(x)/leading coefficient of a₄(x) (Monic)
    b₄(x) = (qa₁ + b₁ + 1) mod a₄
    If (deg a₄ > 3) then
        a' = a₅(x) = Q(x⁷ + b₄²,a₄)
        b' = b₅(x) = (b₄ + 1) mod a₅
    else a' = a₄, b' = b₄
    end
```

In the calculation of $a_5(x)$, $Q(b_4,a_4)=0$ is used because of deg $b_4<$deg $a_4$. In this algorithm, $a_3(x)$ of degree 10 has disappeared, and it is no longer necessary to calculate remainder polynomial and division by it. Also, multiplication necessary for calculating $a_4(x)$ is 9 times only, since the degree of $q^2a_1$ inside Q is seventh and the ground field has characteristic 2. In addition, $b_4(x)$ which is not necessary for calculation of $a_5(x)$ is eliminated from inside Q. Thus, it becomes possible to significantly reduce the number of calculation.

Next, doubling arithmetic is considered. The following transformation 2 is acquired by transforming procedure 1 (2) of the background art as in the previous case.

Transformation 2

```
Input a₁, b₁
Output a', b'
    a₃(x) = a₁²
    b₃(x) = (b₁² + f) mod a₃
    a₄(x) = (f + b₃ + b₃²)/a₃
    a₄(x) ← a₄(x)/leading coefficient of a₄(x)
    b₄(x) = (b₃ + 1) mod a₄
    while (deg a₄ > g) {
        a' = a₅(x) = (f + b₄ + b₄²)/a₄
        b' = b₅(x) = (b₄ + 1) mod a₅
        a₄ = a', b₄ = b'
    }
    end
```

As in the case of additions, the degree of the dividend polynomial is tenth for calculation of $a_4(x)$ and requires plenty of calculation. To reduce it, $q(x)=Q(b_3,a_1)$ is introduced.

Lemma 2

$a_4(x)$ in transformation 2 is given by using $q(x)$ in $a_4(x)=q^2+Q(f,a_3)$.

(Proof)

Since it is $Q(b_3,a_3)=0$ from deg $b_3<$deg $a_3$, $$a_4(x)=Q(f,a_3)+Q(b_3^2,a_3)$$

Suppose $b_3 = r_1 + s_1/a_1$ deg $s_1 <$ deg $a_1$ ($r_1 s_1 \epsilon k[x]$, k is a field of characteristic 2), then $b_3^2 = r_1^2 + s_1^2/a_1^2$ and the second term $Q(b_3^2, a_3)$ is $Q(b_3, a_3)^2$. Therefore, $a_4(x) = q_2 + Q(f, a_3)$ Q.E.D.

If $f(x) = x^7$ is used as in the case of additions, it becomes $Q(x^7, a_3) = x$ since there is no odd-degree term in $a_3(x) = a_1^2(x)$. From this, if algorithm 2 is rewritten by q(x), the following algorithm of the present invention (doubling arithmetic) is acquired.

Algorithm of the Present Invention (Doubling Arithmetic)

```
Input a₁, b₁
Output a', b'
    b₃(x) = b₁² + x(a₁ − x³)²
    q(x) = Q(b₃,a₁)
    a₄(x) = q² + Q(f,a₃)
    a₄(x) ← a₄(x)/leading coefficient of a₄(x)
    b₄(x) = (b₃ + 1) mod a₄
    if (deg a₄ > g) then
        a' = a₅(x) = Q(x⁷ + b₄²,a₄)
        b' = b₅(x) = (b₄ + 1) mod a₅
    else a' = a₄, b' = b₄
    end
```

Moreover, in the calculation of $b_3(x)$, it is used that it becomes $b_1^2$ mod $a_3 = b_1^2$ from $x^7$ mod $a_3 = x(x^3)^2$ mod $a^3 = x(a_1 - (a_1 - x^3))^2$ mod $a_3 = x(a_1 - x_3)^2$ mod $a_3 = x(a_1 - x_3)^2$, deg $b_1^2 <$ deg $a_3$. Also, it is not necessary to store a calculation result of $b_3(x)$. It is because a square can be implemented on a Galois field of characteristic 2 with small-scale hardware and it is more advantageous to have a squarer than a register in terms of size. In particular, it can be implemented just by bit shift when a normal base is used. When $b_3(x)$ is necessary, $a_1(x)$, $b_1(x)$ can be input on a squarer so that its output can be directly used.

As with ordinary additions, in this algorithm, $a_3(x)$ of degree 10 has disappeared, and it is no longer necessary to calculate remainder polynomial and division by it. Also, the degree of $a_4(x)$ is fourth and since ground field has characteristic 2, only squaring is necessary for calculating it and not multiplication. In addition, for calculation of $a_5(x)$, $b_4(x)$ which is not necessary is eliminated from inside Q.

Meanwhile, lemmas 1 holds in cases other than $h(x) = 1$. Also, $Q(f, a_3)$ can easily be calculated noting that the degree of f is $2g+1$, and the degree of $a_3$ is $2g$.

In addition, a hyperelliptic curve may be other than $y^2 + y = x^7$ which is used above. For instance, in the case of $g = 3$, there are $K = GF(2^{61})$ $f(x) = x^7 + x + 1$, $K = GF(2^{67})$ $f(x) = x^7 + 1$, etc. If the portion of $x^7$ in the above algorithm is replaced by such f(x), it becomes effective to newly introduce q(x).

Figure 2:
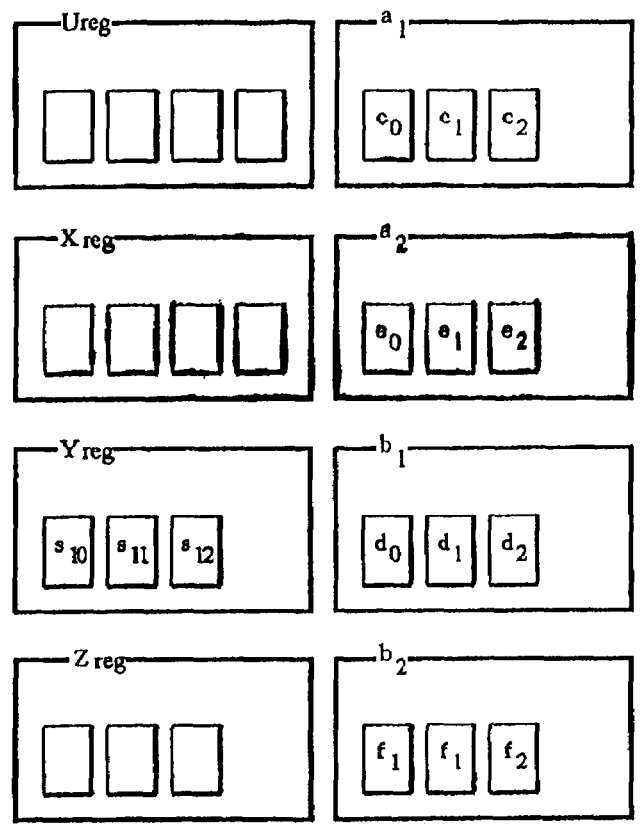
FIG. 2 is a diagram showing the initial state of register group 1 in implementing the algorithm of the present invention (ordinary addition).

FIG. 1 shows an example of implementation of the above algorithm. Register group 1 is connected with selector 1 (3) and selector 2 (9). Both selector 1 (3) and selector 2 (9) are connected with multipliers, squaring 5 and inverter 7. Selector 1 (3) is a selector for input to a register, and selector 2 (9) is a selector for input to multipliers, a squaring and an inverter. Moreover, selector 1 (3), selector 2 (9), multipliers, squaring 5 and inverter 7 are controlled by controller 11 as to their operation (indicated by a broken line in FIG. 1). Register group 1 includes registers Ureg, Xreg, Yreg and Zreg, used as a work area and for storing a result, and registers $a_1$, $a_2$, $b_1$ and $b_2$ for storing $a_1(x)$, $a_2(x)$, $b_1(x)$ and $b_2(x)$ respectively. Moreover, Ureg and Xreg have four locations while the remaining registers have three locations. Furthermore, although it is not illustrated, adders are provided in multipliers, squaring 5, etc. and are operated if additions are instructed by controller 11. It is explained how the circuit in FIG. 1 operates in implementing algorithm of the present invention (addition). FIG. 2 shows the initial state of register group 1. As a prerequisite, Yreg is storing each coefficient of $s_1(x) = s_{12}x^2 + s_{11}x + s_{10}$. Also, $a_1$, $a_2$, $b_1$ and $b_2$ are storing coefficients of $a_1(x)$, $a_2(x)$, $b_1(x)$ and $b_2(x)$ respectively. However, the coefficient of the third-order term which is the highest order is 1, so these do not need to be stored. Namely, $a_1$ is storing $c_2$, $c_1$ and $c_0$, $a_2$ is storing $e_2$, $e_1$ and $e_0$, $b_1$ is storing $d_2$, $d_1$ and $d_0$, and $b_2$ is storing $f_2$, $f_1$ and $f_0$.

First, calculation for acquiring $q(x) = s_1(b_1 + b_2)$ mod $a_2$ is performed. Selector 2 (9) fetches necessary values from register group 1 to implement the following calculation and inputs them into multipliers and squaring 5.

$p_4 = (s_{12}b'_2)$ [coefficient of $x^4$]

$p_3 = (s_{12}b'_1 + s_{11}b'_2)$ [coefficient of $x^3$]

$p_2 = s_{12}b'_0$ [coefficient of $x^2$] (1)

Here, it is as follows.

$(b_1 + b_2) = (d_2 + f_2)x^2 + (d_1 + f_1)x + (d_0 + f_0) = b'_2 x^2 + b'_1 x + b'_0$

Moreover, it is as follows.

$s_1(b_1 + b_2) = (s_{12}b'_2)x^4 + (s_{12}b'_1 + s_{11}b'_2)x^3 + (s_{12}b'_0 + s_{11}b'_1 + s_{10}b'_2)x^2 + (s_{11}b'_0 + s_{10}b'_1)x + s_{10}b'_0$

Figure 3:
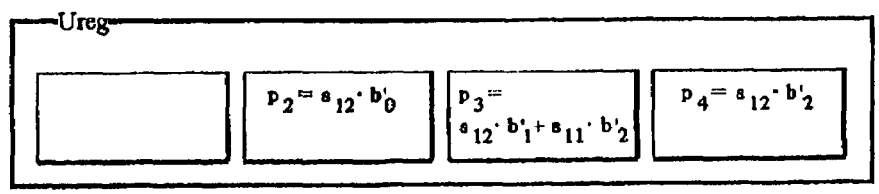
FIG. 3 is a diagram showing the state of Ureg storing the result in process of $q(x)=s_1(b_1+b_2)$ mod $a_2$.

Accordingly, the calculation of (1) is calculation of perfect coefficients of fourth-order and third-order terms and coefficients of a portion of a second-order term of $s_1(b_1 + b_2)$. These calculation results are stored in Ureg by selector 1 (3) (FIG. 3: only Ureg is illustrated). Calculation such as (1) is performed because there is a prerequisite that only four of the multipliers and squaring operators 5 can be used at a time, whereas, since Ureg has four registers, it is also possible to calculate coefficients of the top four terms in (1) if the number of multipliers is not limited. Also, since remainder calculation of $a_2$ is performed, any term of $s_1(b_1 + b_2)$ below third-order which is the highest order of $a_2$ will remain as is. Accordingly, the result will be the same even if coefficients of second-order or lower terms are added after remainder calculation.

Next, for $p_4 x^4 + p_3 x^3 + p_2 x^2$, remainder calculation of $a_2(x) = x^3 + e_2 x^2 + e_1 x + e_0$ and calculation of $s_{10}b'_0 = p_0$ for a coefficient of a 0-th term of $s_1(b_1 + b_2)$ are performed. Accordingly, selector 2 (9) fetches necessary values and inputs them into multipliers and squaring operators 5.

$(p_4 x^4 + p_3 x^3 + p_2 x^2)$ mod $a_2$ $s_{10}b'_0$ [coefficient of $x^0$] (2)

If $(p_4 x^4 + p_3 x^3 + p_2 x^2)$ mod $a_2$ is described further in detail, it will be as follows.

$p'_3 = (p_3 + p_4 e_2)$ [coefficient of $x^3$]

$p'_2 = (p_2 + p_4 e_1)$ [coefficient of $x^2$]

$p'_1 = p_4 e_0$ [coefficient of x] (2)

And, $p'_0 = s_{10}b'_0$ [coefficient of $x^0$]

is also implemented.

Figure 4:
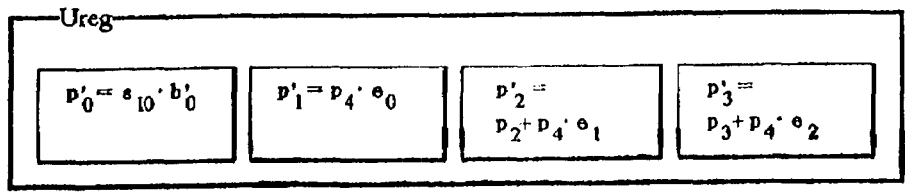
FIG. 4 is a diagram showing the state of Ureg storing the result in process of $q(x)=s_1(b_1+b_2)$ mod $a_2$.

Selector 1 (3) stores these calculation results in Ureg (FIG. 4: only Ureg is illustrated). Calculation such as (2) is performed because the number of multipliers and squaring operators 5 is four.

Next, calculation of $p'_3 x^3 + p'_2 x^2 + p'_1 x + p'_0 \mod a_2$ is performed. If these are described further in detail, it will be as follows, and selector 2 (9) fetches necessary values and inputs them into multipliers and squaring operators 5.

$p''_2 = (p'_2 + p'_3 e_2)$ [coefficient of $x^2$]

$p''_1 = (p'_2 + p'_3 e_2)$ [coefficient of $x^1$]

$p''_0 = (p'_0 + p'_3 e_0)$ [coefficient of $x^0$]  (3)

Figure 5:
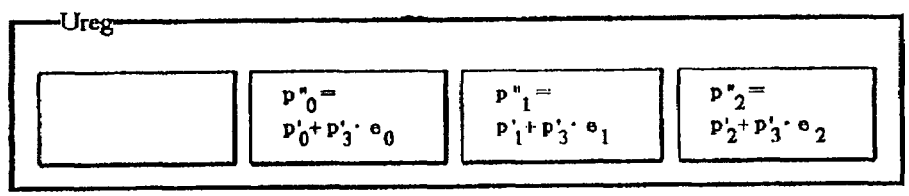
FIG. 5 is a diagram showing the state of Ureg storing the result in process of $q(x)=s_1(b_1+b_2)$ mod $a_2$.

Selector 1 (3) stores these calculation results in Ureg (FIG. 5: only Ureg is illustrated).

Of $s_1(b_1 + b_2)$ in the above calculation, $(s_{11}b'_1 + s_{10}b'_2)x^2 + (s_{11}b'_0 + s_{11}b'_1)x$ is not considered. Accordingly, to perform the following calculation, selector 2 (9) fetches necessary values and inputs them into multipliers and sparing operators 5.

$p''_2 + (s_{11}b'_1 + s_{10}b'_2)$ [coefficient of $x^2$]

$p''_1 + (s_{11}b'_0 + s_{10}b'_1)$ [coefficient of $x$]  (4)

Figure 6:
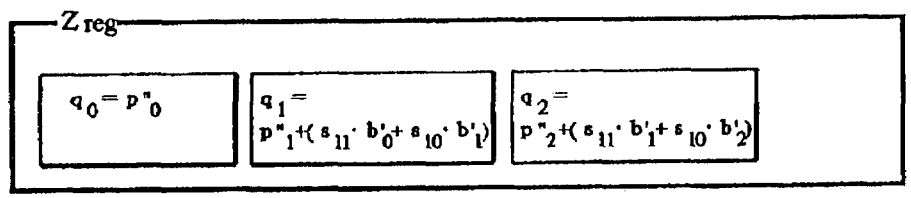
FIG. 6 is a diagram showing the state of Zreg storing the final result of $q(x)$.

By these calculations, $q(x) = q_2 x^2 + q_1 x + q_0$ was acquired. Selector 1 (3) stores these calculation results in Zreg (FIG. 6: only Zreg is illustrated).

Next, calculation of $a_4(x) = Q(q^2 a_1, a_2) + x + c_2 + e_2$ is implemented. For this, $q^2 a_1$ is calculated first. However, it is not necessary to calculate second-order or lower terms, since it is calculation of a quotient of $a_2$. To perform the following calculation, selector 2 (9) fetches necessary values from register group 1 and inputs them into multipliers and squaring operators 5.

$p_7 = q_2^2$ [coefficient of $x^7$]

$p_6 = q_2^2 c_2$ [coefficient of $x^6$]

$p_5 = q_2^2 c_1 + q_1^2$ [coefficient of $x^5$]

$p_4 = q_1^2 c_2 + q_2^2 c_0$ [coefficient of $x^4$]  (1)

Figure 7:
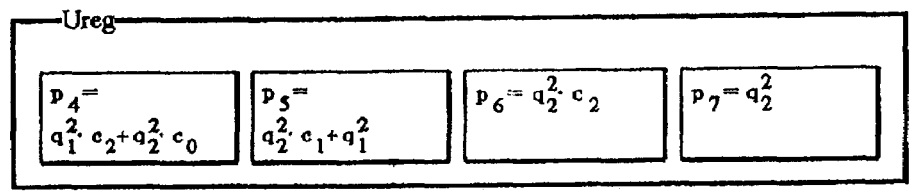
FIG. 7 is a diagram showing the state of Ureg storing the result in process of $a_4(x)=Q(q^2a_1,a_2)+x+c_2+e_2$.

Here, calculation of a third-order term of $q^2 a_1$ is not implemented since the number of multipliers and locations of Ureg are lacking. Selector 1 (3) stores these calculation results in Ureg (FIG. 7: only Ureg is illustrated).

Moreover, $q^2 a_1$ is as follows.

$q^2 a_1 = q_2^2 x^7 + q_2^2 c_2 x^6 + (q_2^2 c_1 + q_1^2) x^5 + (q_1^2 c_2 + q_2^2 c_0) x^4 + (q_1^2 c_0 + q_0^2 c_2) x^2 + q_0^2 c_1 x + q_0^2 c_0$

Along with calculation of (1), calculation of a inversion of $q_2^2$ is started. For this, selector 2 (9) inputs into inverter 7 a result of $q_2^2$ calculated by multipliers and squaring operators 5. It is assumed: $q^- = 1/q_2^2$.

Next, calculation for acquiring a quotient by $a_2$ is performed. It is performed by carrying out remainder calculation by $a_2$. Accordingly, to perform the following calculation, selector 2 (9) fetches necessary values from register group 1 and inputs them into multipliers and squaring operators 5.

$p'_6 = p_6 + p_7 e_2$ [coefficient of $x^6$]

$p'_5 = p_5 + p_7 e_1$ [coefficient of $x^5$]

$p'_4 = p_4 + p_7 e_0$ [coefficient of $x^4$]

$p'_3 = (q_1^2 c_1 + q_0^2)$ [coefficient of $x^3$]  (2)

Figure 8:
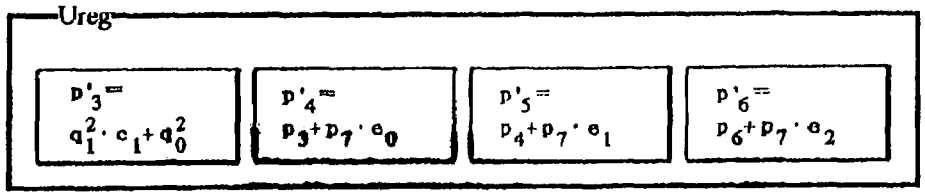
FIG. 8 is a diagram showing the state of Ureg storing the result in process of $a_4(x)=Q(q^2a_1,a_2)+x+c_2+e_2$.

In calculating a quotient by $a_2$, $p_7 x^4$ is a term first acquired, and $p_7$ has already been acquired and $a_4$ to be finally acquired will be rendered a monic polynomial, not requiring store in Ureg. Selector 1 (3) stores these calculation results in Ureg (FIG. 8: only Ureg is illustrated).

Furthermore, remainder calculation by $a_2$ is performed. However, since a coefficient of a third-order term of $a_4$ (before rendering monic) is also acquired in this calculation, it will be stored in Ureg together. Accordingly, to perform the following calculation, selector 2 (9) fetches necessary values from register group 1 and inputs them into multipliers and squaring operators 5.

$p''_5 = p'_5 + p'_6 e_2$ [coefficient of $x^5$]

$p''_4 = p'_4 + p'_6 e_1$ [coefficient of $x^4$]

$p''_3 = p'_3 + p'_6 e_0$ [coefficient of $x^3$](3)

Moreover, a4 before rendering a monic polynomial is described as follows.

$a_4(x) = a'_{44} x^4 + a'_{43} x^3 + a'_{42} x^2 + a'_{41} x + a'_{40}$

Here, it is $a'_{43} = p'_6$ [coefficient of a third-order term of $a_4$].

Figure 9:
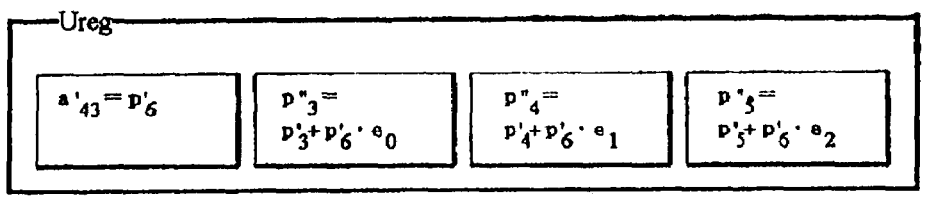
FIG. 9 is a diagram showing the state of Ureg storing the result in process of $a_4(x)=Q(q^2a_1,a_2)+x+c_2+e_2$.

Selector 1 (3) fetches $p'_6$ from Ureg and stores it along with these calculation results in Ureg (FIG. 9: only Ureg is illustrated).

Remainder calculation by $a_2$ is further performed. However, since a coefficient of a second-order term of $a_4$ (before rendering monic) is also acquired in this calculation, it will be stored in Ureg together. Accordingly, to perform the following calculation, selector 2 (9) fetches necessary values from register group 1 and inputs them into multipliers and squaring operators 5.

$p_{34} = p''_4 + p''_5 e_2$ [coefficient of $x^4$]

$p_{33} = p''_3 + p''_5 e_1$ [coefficient of $x^3$]  (4)

Here, it is $a'_{42} = p'_5$ [coefficient of a second-order term of $a_4$].

Figure 10:
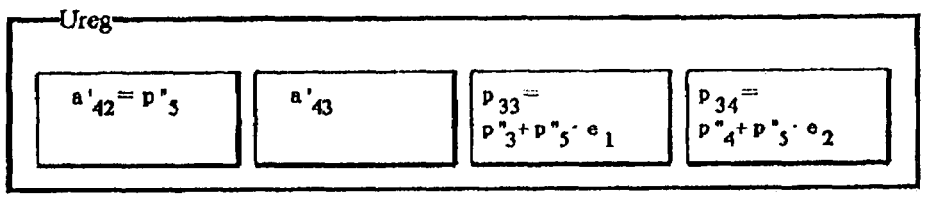
FIG. 10 is a diagram showing the state of Ureg storing the result in process of $a_4(x)=Q(q^2a_1,a_2)+x+c_2+e_2$.

Selector 1 (3) fetches $p''_5$ and $a'_{43}$ from Ureg and stores it along with these calculation results in Ureg (FIG. 10: only Ureg is illustrated).

Remainder calculation by $a_2$ is further performed. However, since a coefficient of a first-order term of $a_4$ (before rendering monic) is also acquired in this calculation, it will be stored in Ureg together. Additions of terms other than Q of $a_4$ are also performed. Accordingly, to perform the following calculation, selector 2 (9) fetches necessary values from register group 1 and inputs them into multipliers and squaring operators 5.

$p_{43} = p_{33} + p_{34} e_2$ [coefficient of $x^3$]

$a'_{41} = p_{34} + 1$ [coefficient of a first-order term of $a_4$]  (5)

Figure 11:
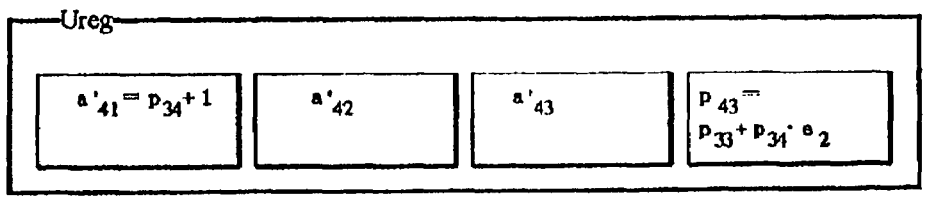
FIG. 11 is a diagram showing the state of Ureg storing the result in process of $a_4(x)=Q(q^2a_1,a_2)+x+c_2+e_2$.

Selector 1 (3) fetches $a'_{42}$ and $a'_{43}$ from Ureg and stores them along with these calculation results in Ureg (FIG. 11: only Ureg is illustrated).

Next, to calculate a coefficient of a 0-th-order term of $a_4$ (before rendering monic) and also to perform additions of terms other than Q of $a_4$, selector 2 (9) fetches necessary values from register group 1 and inputs them into multipliers and squaring operators 5.

$a'_{40} = p_{43} + c_2 + e_2$ [constant term of $a_4$]  (6)

Figure 12:
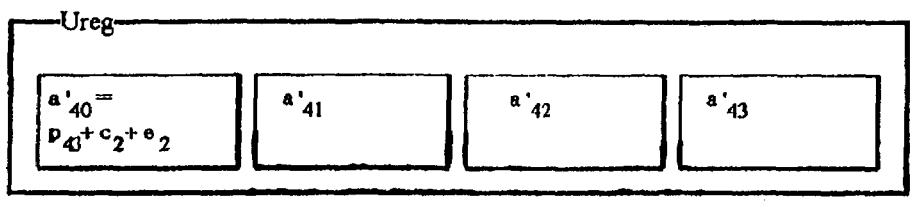
FIG. 12 is a diagram showing the state of Ureg storing the result in process of $a_4\ (x)=Q(q^2a_1,a_2)+x+c_2+e_2$.

Selector 1 (3) fetches $a'_{42}$, $a'_{43}$ and $a'_{41}$ from Ureg and stores them along with these calculation results in Ureg (FIG. 12: only Ureg is illustrated). Thus, the value of $a_4$ before rendering monic is acquired.

Next, $a_4$ is rendered a monic polynomial. a4 is fourth-order and its coefficient is $q_2^2$. Accordingly, awaiting the end of the calculation explained above, each coefficient of Ureg is multiplied by $q^-$. Namely, to perform the following calculation, selector 2 (9) fetches necessary values from inverter 7 and register group 1 and inputs them into multipliers and squaring operators 5.

$$a'_{43}q^-$$

$$a'_{42}q^-$$

$$a'_{41}q^-$$

$$a'_{40}q^- \tag{7}$$

Figure 13:
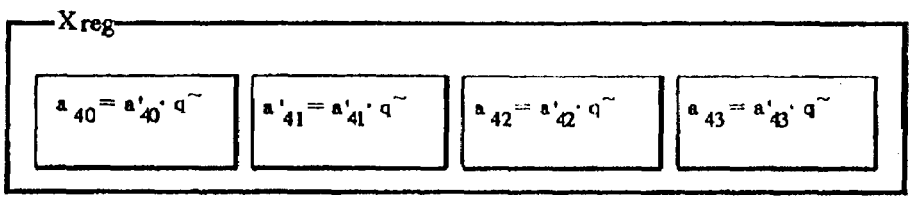
FIG. 13 is a diagram showing the state of Xreg storing the final result of $a_4(x)$ rendered monic.

Selector 1 (3) stores these calculation results in Xreg (FIG. 13: only Xreg is illustrated). Thus, the value of $a_4$ rendered a monic polynomial is acquired.

Next, $b_4(x)=(qa_1+b_1+1) \mod a_4$ is calculated. First, $(qa_1+b_1+1)$ is calculated in the following manner because of limitation of the number of Ureg's locations and the number of multipliers. Moreover, since $a_4$ is an polynomial of degree 4, result will be the same even if third or lower terms of $(qa_1+b_1+1)$ are added after the remainder calculation. Selector 2 (9) fetches necessary values from register group 1 and inputs them into multipliers and squaring operators 5.

$p_5 = q_2$ [coefficient of $x^5$]

$p_4 = (q_2c_2+q_1)$ [coefficient of $x^4$]

$p_3 = (q_2c_1+q_1c_2+q_0)$ [coefficient of $x^3$]

$$p_2 = (d_2+q_2c_0) \text{ [coefficient of } x^2\text{]} \tag{8}$$

Figure 14:
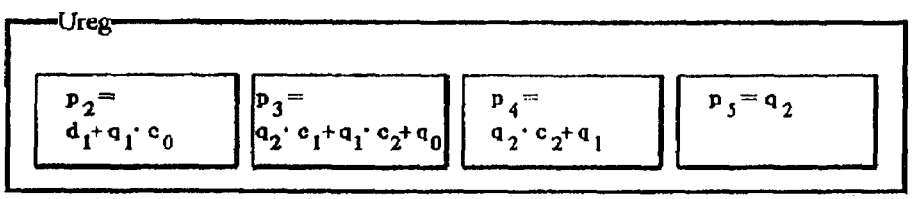
FIG. 14 is a diagram showing the state of Ureg storing the result in process of $b_4(x)=(qa_1+b_1+1)$ mod $a_4$.

Selector 1 (3) stores these calculation results in Ureg (FIG. 14: only Ureg is illustrated).

Moreover, $$qa_1b_1+q_2x^5+(q_2c_2+q_0)x^{3+}+(d_2+q_2c_0+q_1c_1+q_0c_2)x^2+$$
$$(d_1+q_1c_0+c_1)x+d_0+q_0c_0+1$$

And the remainder by $a_4$ is calculated. Moreover, since a term of $x^1$ appears by this remainder calculation, an additions of $d_1x$ is also performed. The following calculation is performed if described in detail. For this, selector 2 (9) fetches necessary values from register group 1 and inputs them into multipliers and squaring operators 5.

$p'_4 = p_4+p_5a_{43}$ [coefficient of $x^4$]

$p'_3 = p_3+p_5a_{42}$ [coefficient of $x^3$]

$p'_2 = p_2+p_5a_{41}$ [coefficient of $x^2$]

$$p'_1 = p_1+p_5a_{40}+d_1 \text{ [coefficient of } x^1\text{]} \tag{9}$$

Figure 15:
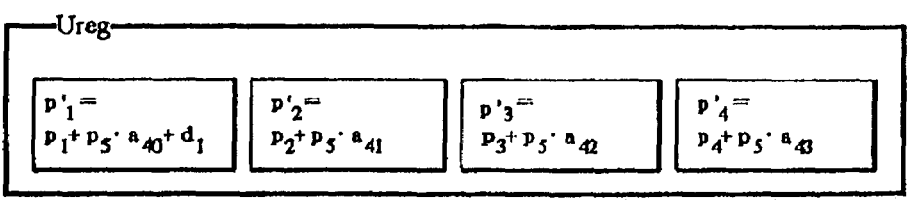
FIG. 15 is a diagram showing the state of Ureg storing the result in process of $b_4(x)=(qa_1+b_1+1)$ mod $a_4$.

Selector 1 (3) stores these calculation results in Ureg (FIG. 15: only Ureg is illustrated).

Remainder calculation by $a_4$ is performed again. Moreover, since a coefficient of term of $x^0$ is calculated by this remainder calculation, an addition of $d_0+1$ is also performed. The following calculation is performed if described in detail. For this, selector 2 (9) fetches necessary values from register group 1 and inputs them into multipliers and squaring operators 5.

$p''_3 = p'_3+p'_4a_{43}$ [coefficient of $x^3$]

$p''_2 = p'_2+p'_4a_{42}$ [coefficient of $x^2$]

$p''_1 = p'_1+p'_4a_{41}$ [coefficient of $x^1$]

$$p''_0 = p'_4a_{40}+d_0+1 \text{ [coefficient of } x^0\text{]} \tag{10}$$

Figure 16:
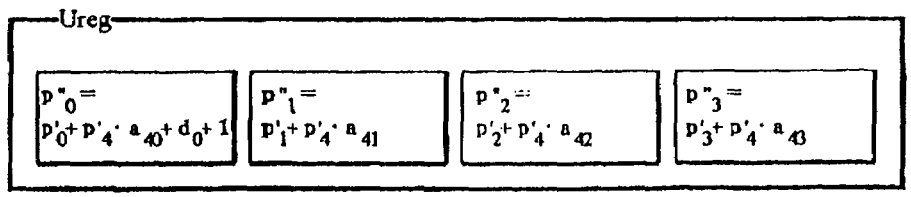
FIG. 16 is a diagram showing the state of Ureg storing the result in process of $b_4(x)=(qa_1+b_1+1)$ mod $a_4$.

Selector 1 (3) stores these calculation results in Ureg (FIG. 16: only Ureg is illustrated).

Next, in $(qa_1+b_1+1)$, the terms which do not influence the remainder calculation of $a_4$ and have not been added in (8) through (10) are added. The following calculation is performed if described in detail. Selector 2 (9) fetches necessary values from register group 1 and inputs them into multipliers and squaring operators 5.

$p_{32} = p''_2+c_1q_1$ [coefficient of $x^2$]

$$p_{31} = p''_1+c_0q_1 \text{ [coefficient of } x^1\text{]} \tag{11}$$

Figure 17:
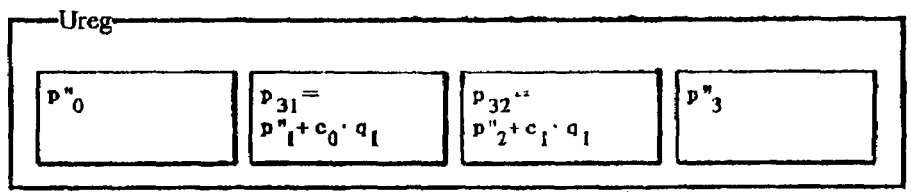
FIG. 17 is a diagram showing the state of Ureg storing the result in process of $b_4(x)=(qa_1+b_1+1)$ mod $a_4$.

Selector 1 (3) stores these calculation results in Ureg (FIG. 17: only Ureg is illustrated).

In $(qa_1+b_1+1)$, the terms which do not influence the remainder calculation of $a_4$ and have not been added in (8) through (11) are added. The following calculation is performed if described in detail. Selector 2 (9) fetches necessary values from register group 1 and inputs them into multipliers and squaring operators 5.

$b_{42} = p_{32}+c_2q_0$ [coefficient of $x^2$]

$b_{41} = p_{31}+c_1q_0$ [coefficient of $x^1$]

$b_{40} = p''_0+c_0q_0$ [coefficient of $x^1$]

Figure 18:
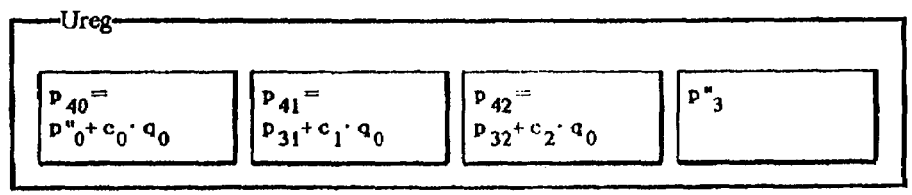
FIG. 18 is a diagram showing the state of Ureg storing the result in process of $b_4(x)=(qa_1+b_1+1)$ mod $a_4$.

Selector 1 (3) stores these calculation results in Ureg (FIG. 18: only Ureg is illustrated).

Figure 19:
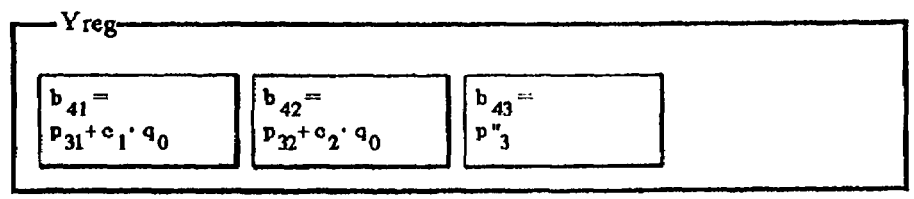
FIG. 19 is a diagram showing the state of Yreg and Zreg storing the final result of $b_4(x)$.
Figure 19:
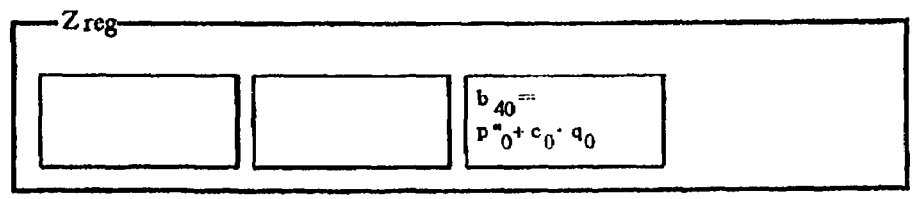

Thus, $b_4(x)$ is acquired. Moreover, it is denoted as $b_4(x)=b_{43}x_3+b_{42}x^2+b_{41}x+b_{40}$. Finally, selector 1 (3) stores the contents of Ureg in Yreg and Zreg (FIG. 19: only Yreg and Zreg are illustrated).

Next, $a_5(x)=Q(x^7+b_4{}^2,a_4)$ is calculated. Since $a_4$ is an polynomial of degree 4, the third or lower terms of $x^7+b_4{}^2$ are not necessary for calculation of Q. As it is $b_4{}^2 = b_{43}{}^2x^6+b_{42}{}^2x^4+b_{41}{}^2x^2+b_{40}{}^2$, only $b_{43}{}^2x^6+b_{42}{}^2x^4+x^7$ is used. Namely, to perform the following calculation, selector 2 (9) fetches necessary values from register group 1 and inputs them into multipliers and squaring operators 5.

$p_{17} = 1$ [coefficient of $x^7$]

$p_{16} = b_{43}{}^2$ [coefficient of $x^6$]

$p_{15} = 0$ [coefficient of $x^5$]

$$p14 = b_{42}{}^2 \text{ [coefficient of } x^4\text{]} \tag{1}$$

Figure 20:
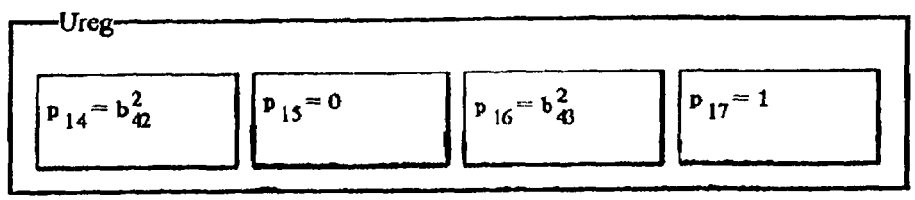
FIG. 20 is a diagram showing the state of Ureg storing the result in process of $a_5(x)=Q(x^7+b_4^2, a_4)$.

Selector 1 (3) stores these calculation results in Ureg (FIG. 20: only Ureg is illustrated).

Next, remainder calculation by $a_4$ is performed. More concretely, the following calculation is performed. Accordingly, selector 2 (9) fetches necessary values from register group 1 and inputs them into multipliers and squaring operators 5.

| (2-1) | |
|---|---|
| $p_{26}$ | $= p_{16} + p_{17}a_{43}$ |
| | $= p_{16} + a_{43}$ [coefficient of $x^6$] |
| $p_{25}$ | $= p_{15} + p_{17}a_{42}$ |
| | $= a_{42}$ [coefficient of $x^5$] |
| $p_{24}$ | $= p_{14} + p_{17}a_{41}$ |
| | $= p_{14} + a_{41}$ [coefficient of $x^4$] |

Moreover, it becomes $a_{53} = p_{17}$ [coefficient of a third-order term of $a_5$].

Figure 21:
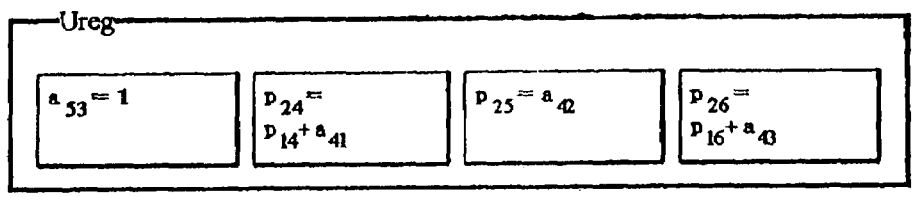
FIG. 21 is a diagram showing the state of Ureg storing the result in process of $a_5(x)=Q(x^7+b_4^2,a_4)$.

Selector 1 (3) fetches $p_{17}=1$ and stores it along with these calculation results in Ureg (FIG. 21: only Ureg is illustrated). Moreover, it will be $a_5(x) = a_{53}x^3+a_{52}x^2+a_{51}x+a_{50}$.

Remainder calculation by $a_4$ is further performed. More concretely, the following calculation is performed. Accordingly, selector 2 (9) fetches necessary values from register group 1 and inputs them into multipliers and squaring operators 5.

$$p_{35}=p_{25}+p_{26}a_{43} \text{ [coefficient of } x^5]$$

$$p_{34}=p_{24}+p_{26}a_{42} \text{ [coefficient of } x^4] \tag{2-2}$$

Moreover, it becomes $a_{52}=p_{26}$[coefficient of a second-order term of $a_5$].

Figure 22:
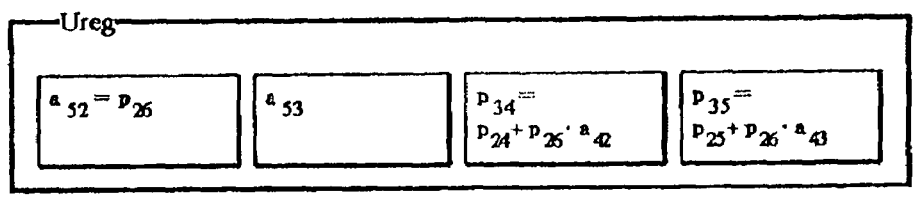
FIG. 22 is a diagram showing the state of Ureg storing the result in process of $a_5(x)=Q(x^7+b_4^2,a_4)$.

Selector 1 (3) fetches $p_{17}$ and $p_{26}$ and stores them along with these calculation results in Ureg (FIG. 22: only Ureg is illustrated).

Remainder calculation by $a_4$ is further performed. More concretely, the following calculation is performed. Accordingly, selector 2 (9) fetches necessary values from register group 1 and inputs them into multipliers and squaring operators 5.

$$a_{50}=p_{34}+p_{35}a_{43} \text{ [constant term of } a_5] \tag{2-3}$$

Figure 23:
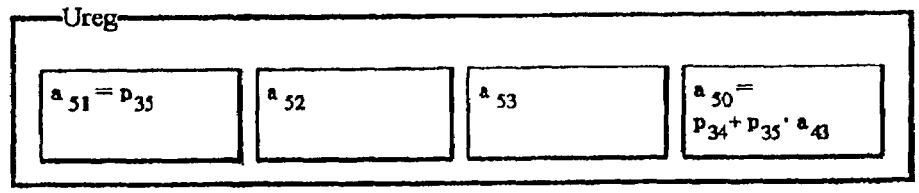
FIG. 23 is a diagram showing the state of Ureg storing the result in process of $a_5(x)=Q(x^7+b_4^2,a_4)$.

Moreover, it becomes $a_{51}=p_{35}$ [coefficient of a first-order term of $a_5$]. Selector 1 (3) fetches $p_{17}$, $p_{26}$ and $p_{35}$ and stores them along with these calculation results in Ureg (FIG. 23: only Ureg is illustrated). Thus, $a_5$ is calculated.

Figure 24:
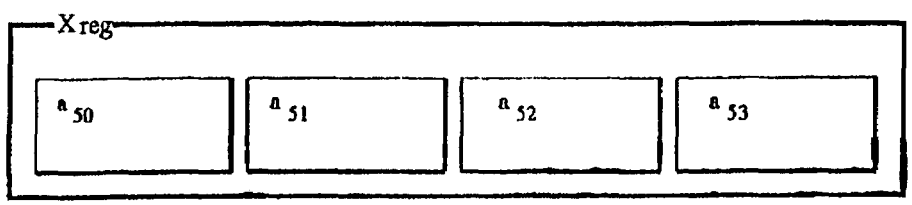
FIG. 24 is a diagram showing the state of Xreg storing the final result of $a_5\ (x)$.

In the process of (3), selector 1 (3) stores $a_5(x)$ stored in Ureg into Xreg (FIG. 24: only Xreg is illustrated).

Figure 25:
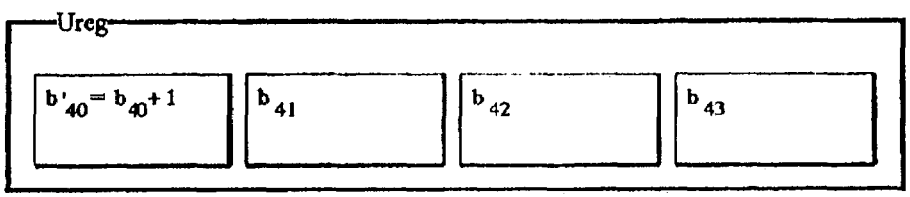
FIG. 25 is a diagram showing the state of Ureg storing the result in process of $b_5(x)=(b_4+1)$ mod $a_5(x)$.

Next, $b_5(x)=(b_4+1) \bmod a_5(x)$ is calculated. $b_4$ is stored in Yreg and Zreg. First, as a process of (4), selector 1 (3) stores $b_{43}$, $b_{42}$, $b_{41}$ and $b_{40}+1$ in Ureg (FIG. 25: only Ureg is illustrated).

Next, remainder calculation by $a_5$ is performed. The required calculation is described in detail as follows. Accordingly, selector 2 (9) fetches necessary values from register group 1 and inputs them into multipliers and squaring operators 5.

$$b_{52}=b_{42}+b_{43}a_{52} \text{ [coefficient of a second-order term of } b_5]$$

$$b_{51}=b_{41}+b_{43}a_{51} \text{ [coefficient of a first-order term of } b_5]$$

$$b_{50}=b_{40}+b_{43}a_{50} \text{ [coefficient of a 0-th-order term of } b_5] \tag{5}$$

Figure 26:
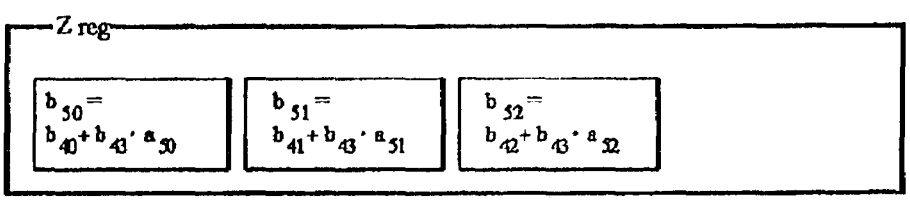
FIG. 26 is a diagram showing the state of Zreg storing the final result of $b_5(x)$.

It is represented as $b_5(x)=b_{52}x^2+b_{51}x+b_{50}$. Selector 1 (3) stores these calculation results in Zreg (FIG. 26: only Ureg is illustrated). Accordingly, $a_5$ and $b_5$ are stored in Xreg and Zreg. Moreover, as solution, $a'=a_5$, $b'=b_5$.

Operation of the circuit in FIG. 1 in implementing the algorithm of the present invention (doubling arithmetic) is explained. The initial state in FIG. 2 is not so different in the case of doubling arithmetic. However, registers $a_2$ and $b_2$ become empty.

First, in order to calculate $q(x)=Q(b_3,a_1)$, $b^3(x)=b_1^2+x(a_1-x^3)^2$ is calculated. However, since $a_1$ is a polynomial of degree 3 expression, only third-order or higher terms of $b_3(x)$ need to be calculated. It is as follows if described further in detail. Selector 2 (9) fetches necessary values from register group 1 and inputs them into multipliers and squaring operators 5.

$$b_{35}=c_2^2 \text{ [coefficient of } x^5]$$

$$b_{34}=d_2^2 \text{ [coefficient of } x^4]$$

$$b_{33}=c_1^2 \text{ [coefficient of } x^3] \tag{1}$$

Figure 27:
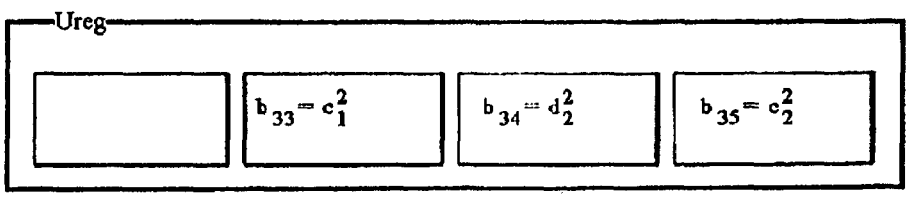
FIG. 27 is a diagram showing the state of Ureg storing the result in process of $q(x)=Q(b_3,a_1)$.

Selector 1 (3) stores these calculation results in Ureg (FIG. 27: only Ureg is illustrated).

Moreover, it is as follows.

$$b_2^1+x(a_1-x^3)^2=c_2^2x^5+d_2^2x^4+c_1^2x^3+d_1^2x^2+c_0^2x+d_0^2=b_{35}x^5+b_{34}x^4+b_{33}x^3+b_{32}x^2+b_{31}x+b_{30}$$

Next, $Q(b_3,a_1)$ is calculated. It is as follows if described further in detail. Selector 2 (9) fetches necessary values from register group 1 and inputs them into multipliers and squaring operators 5.

$$p_{14}=b_{34}+b_{35}c_2 \text{ [coefficient of } x^4]$$

$$p_{13}=b_{33}+b_{35}c_1 \text{ [coefficient of } x^3]$$

$$p_{12}=b_{35}c_0 \text{ [coefficient of } x^2] \tag{2-1}$$

Moreover, it is $q_2=b_{35}$. It is represented as $q(x)=q_2x^2+q_1x+q_0$.

Figure 28:
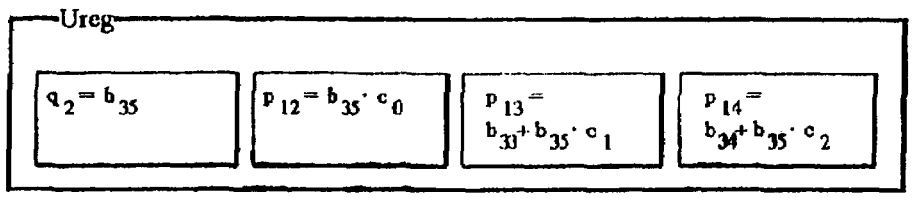
FIG. 28 is a diagram showing the state of Ureg storing the result in process of $q(x)=Q(b_3,a_1)$.

Selector 1 (3) fetches $b_{35}$ from register group 1 and stores them along with these calculation results in Ureg (FIG. 28: only Ureg is illustrated).

Likewise, remainder calculation by $a_1$ is performed. It is as follows if described further in detail. Selector 2 (9) fetches necessary values from register group 1 and inputs them into multipliers and squaring operators 5.

$$p_{23}=p_{13}+p14c_2 \text{ [coefficient of } x^3]$$

$$(p_{22}=p_{12}+p14c_1 \text{ [coefficient of } x^2]) \tag{2-2}$$

Figure 29:
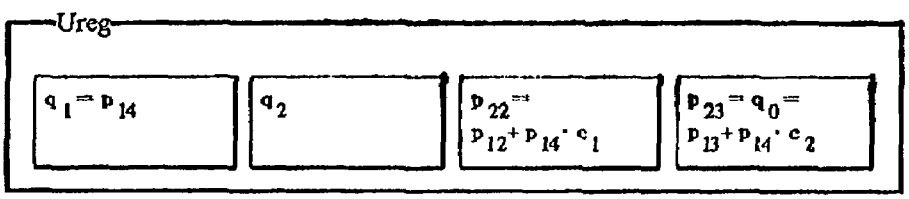
FIG. 29 is a diagram showing the state of Ureg storing the final result of $q(x)$.

Moreover, it is $q_1=p_{14}$. Also, $q_0=p_{23}$. Selector 1 (3) fetches $q_2$ and $p_{14}$ from register group 1 and stores them along with these calculation results in Ureg (FIG. 29: only Ureg is illustrated).

Moreover, to simultaneously acquire an inversion of $c_2^2$, selector 2 (9) receives $c_2^2$ from squaring operators 5 and inputs them into inverter 7. Here, it is $q^-=1/c_2^2$.

As it is necessary to render $a_4(x)=q^2(x)+x$ monic, the following calculation is performed. Selector 2 (9) fetches necessary values from register group 1 and inverter 7 and inputs them into multipliers and squaring operators 5.

$$a_{43}=0 \text{ [coefficient of } x^3]$$

$$a_{42}=q_1^2q^{-2} \text{ [coefficient of } x^2]$$

$$a_{41}=1q^{-2} \text{ [coefficient of } x]$$

$$a_{40}=q_0^2q^{-2} \text{ [coefficient of } x^0] \tag{3}$$

Figure 30:
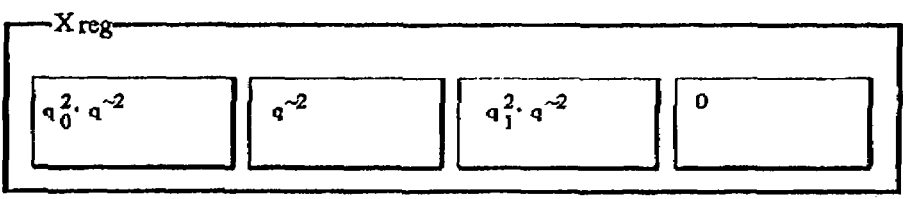
FIG. 30 is a diagram showing the state of Xreg storing $a_4(x)=q^2(x)+x$ rendered monic.

Selector 1 (3) stores these calculation results in Xreg (FIG. 30: only Xreg is illustrated). Moreover, since it is $a_{44}=1$ [coefficient of $x^4$], it is not necessary to consciously store it. It is represented as $a_4(x)=x^4+a_{43}x^3+a_{42}x^2+a_{41}x+a_{40}$.

Next, $b_4=(b_3+1) \bmod a_4$ is calculated. Since $a_4$ is a polynomial of degree 4, calculation results are the same if the third or lower terms of $(b_3+1)$ are added after remainder calculation. Considering limitation of the number of Ureg's locations and the number of multipliers, the following calculation is performed. Moreover, selector 2 (9) fetches necessary values from register group 1 and inputs them into multipliers and squaring operators 5.

$$b_{35}=c_2^2 \text{ [coefficient of } x^5]$$

$$b_{34}=d_2^2 \text{ [coefficient of } x^4]$$

$$b_{33}=c_1^2 \text{ [coefficient of } x^3]$$

$$b_{32}=d_1^2 \text{ [coefficient of } x^2] \tag{4}$$

Figure 31:
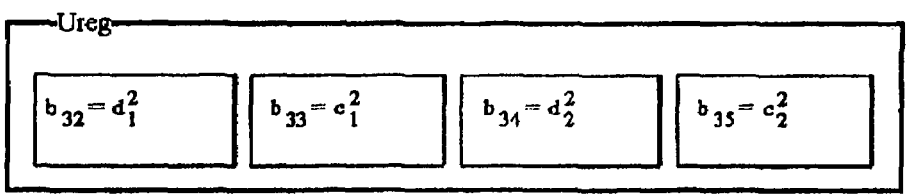
FIG. 31 is a diagram showing the state of Ureg storing the result in process of $b_4=(b_3+1)$ mod $a_4$.

Selector 1 (3) stores these calculation results in Ureg (FIG. 31: only Ureg is illustrated).

And remainder calculation by $a_4$ is performed. However, a first-order term of $b_3$ is added. The following calculation is performed if described further in detail. Selector 2 (9) fetches necessary values from register group 1 and inputs them into multipliers and squaring operators 5.

| | |
|---|---|
| (5) $p_{14}$ | $= b_{34} + b_{35}a_{43}$ |
| | $= b_{34}$ [coefficient of $x^4$] |
| $p_{13}$ | $= b_{33} + b_{35}a_{42}$ [coefficient of $x^3$] |
| $p_{12}$ | $= b_{32} + b_{35}a_{41}$ [coefficient of $x^2$] |
| $p_{11}$ | $= b_{35}a_{40} + c_0^2$ [coefficient of $x^1$] |

Figure 32:
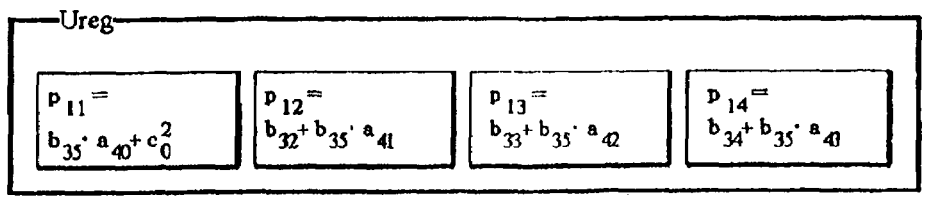
FIG. 32 is a diagram showing the state of Ureg storing the result in process of $b_4=(b_3+1)$ mod $a_4$.

Selector 1 (3) stores these calculation results in Ureg (FIG. 32: only Ureg is illustrated).

Remainder calculation by $a_4$ is further performed. However, a constant term of $b_3$ and 1 are added. The following calculation is performed if described further in detail. Selector 2 (9) fetches necessary values from register group 1 and inputs them into multipliers and squaring operators 5.

$$p_{23}=p_{13}+p_{14}a_{43} \text{ [coefficient of } x^3\text{]}$$

$$p_{22}=p_{12}+p_{14}a_{42} \text{ [coefficient of } x^2\text{]}$$

$$p_{21}=p_{11}+p_{14}a_{41} \text{ [coefficient of } x^1\text{]}$$

$$p_{20}=p_{14}a_{40}+d_0^2+1 \text{ [coefficient of } x^0\text{]} \quad (4)$$

Figure 33:
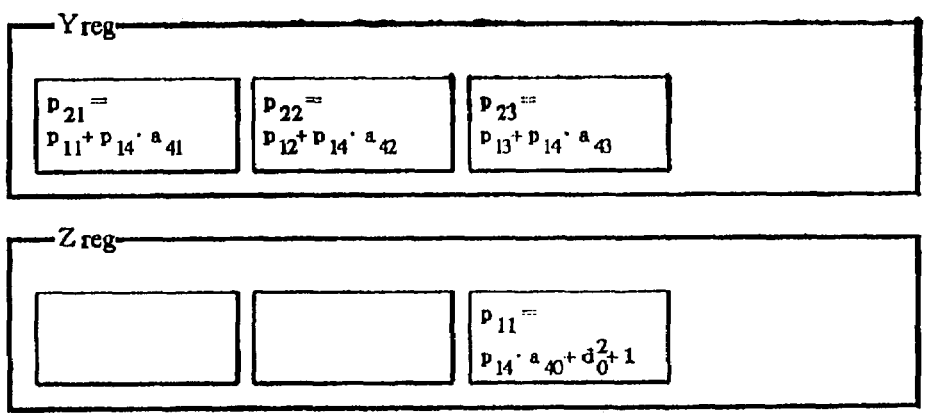
FIG. 33 is a diagram showing the state of Yreg and Zreg storing the final result of $b_4$.

Selector 1 (3) stores these calculation results in Yreg and Zreg (FIG. 33: only Yreg and Zreg are illustrated). Thus, $b_4$ is acquired.

Calculation hereafter is the same as ordinary additions.

Figure 34:
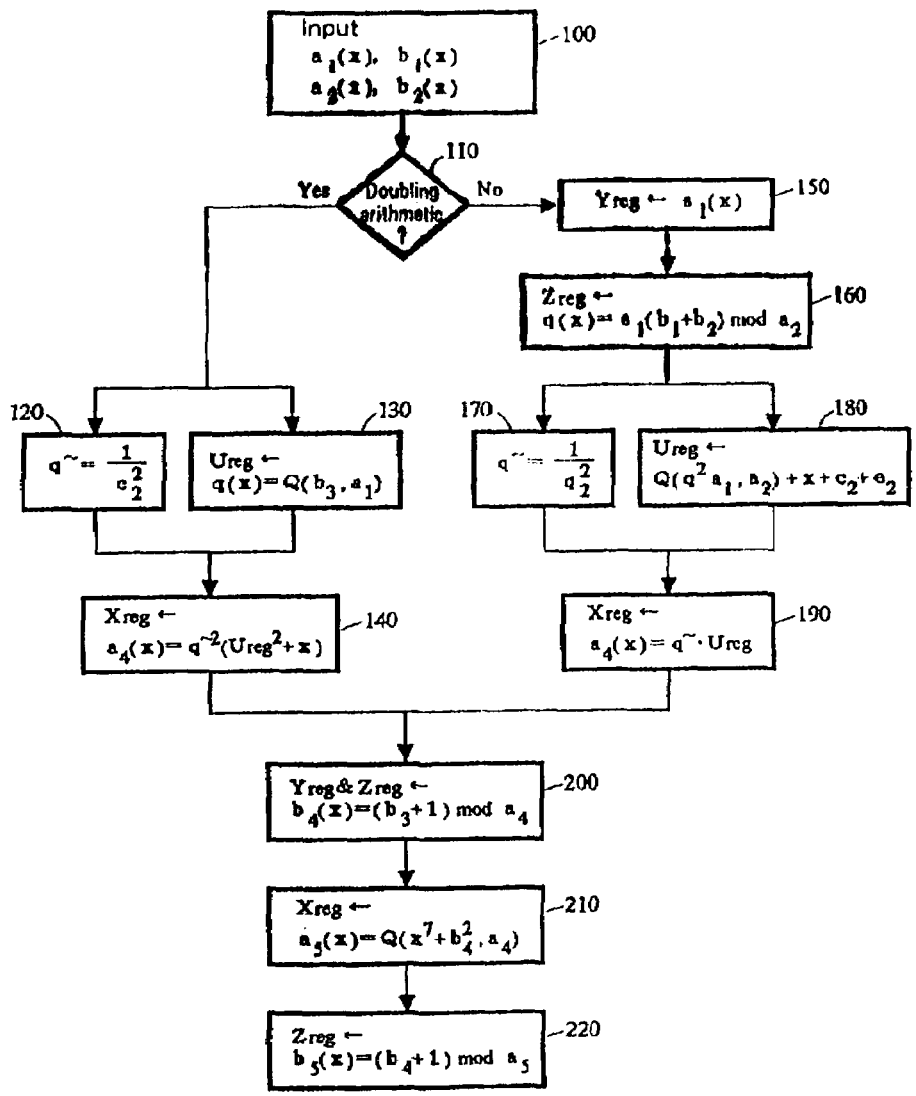
FIG. 34 is a flowchart showing the algorithm of the present invention.

The above is illustrated as a processing flow as in FIG. 34. First, $a_1(x)$, $b_1(x)$, $a_2(x)$ and $b_2$ are input (step 100). In the case of doubling arithmetic, only $a_1(x)$ and $b_1(x)$ are input. Next, the process is switched depending on whether it is an ordinary addition or doubling arithmetic (step 110). In the case of doubling arithmetic, $q^-=1/c_2^2$ is calculated (step 120). Also, $q(x)=Q(b_3,a_1)$ is stored in Ureg (step 130). In a circuit as in FIG. 1, steps 120 and 130 are simultaneously performed. And then, $a_4(x)=q^{-2}(Ureg^2+x)$ rendered monic is calculated and stored in Xreg (step 140). On the other hand, if it is determined as an ordinary addition in step 110, a greatest common polynomial of $a_1$ and $a_2$ is calculated. If the greatest common polynomial is not 1, it is not handled by the present invention. And $s_1$ which is $s_1(x)a_1(x)+s_2(x)a_2(x)=1$ is calculated and stored in Yreg (step 150). Next, $q(x)=s_1(b_1+b_2)$ mod a2 is calculated and stored in Zreg (step 160). And $q^-=1/q_2^2$ is calculated (step 170). Also, $Q(q^2a_1,a_2)+x+c_2+e_2$ is calculated and stored in Ureg (step 180). Steps 170 and 180 are simultaneously performed in a circuit in FIG. 1. And then, $a_4(x)=q^-Ureg$ rendered monic is calculated and stored in Xreg (step 190).

The following process is in common with an ordinary addition and doubling arithmetic. $b_4(x)=(b_3+1)$ mod $a_4$ is calculated and stored in Yreg and Zreg (step 200). However, the definition of $b_3$ is different depending on whether it is an ordinary addition or doubling arithmetic. And $a_5(x)=Q(x^7+b_2^2,a_4)$ is calculated and stored in Xreg (step 210). Finally, $b_5(x)=(b_4+1)$ mod $a_5$ is calculated and stored in Zreg (step 220).

Figure 35:
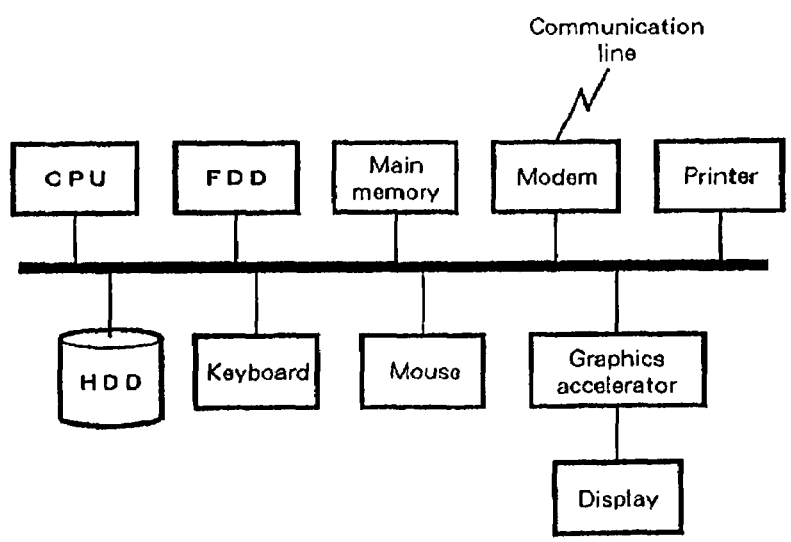
FIG. 35 is a diagram showing configuration of an ordinary computer.

A process as in FIG. 34 can be implemented in a computer program for an ordinary computer (FIG. 35 for instance). However, there is a limit to improvement of processing speed since squaring cannot be performed at high speed by an ordinary computer.

Moreover, it is possible to construct an encryptor, a decoder or an encryption system including them by implementing an apparatus and a program which execute such an algorithm of the present invention.

[Advantages of the Invention]

Operation in Jacobian could successfully be implemented with improved computation complexity.

It was also made possible to implement operation in Jacobian with improved hardware size.

[Evaluation of Computation Complexity]

The number of execution of multiplication of the algorithm (ordinary addition and doubling arithmetic) of the present invention is evaluated. It is defined that hereafter m means one multiplier performing multiplication once, and M means multiple multipliers simultaneously performing multiplication once. Namely, m is used to represent frequency of multiplication and M represents frequency of multiplier group being executed. Also, I means computing once for the multiplicative inverse. Hereafter, I, M and m are used to represent computation complexity. For instance, I+2m represents that computing once for the multiplicative inverse and multiplying twice. The following Table 1 and Table 2 summarize computation complexity of an addition and doubling arithmetic.

TABLE 1

| Calculation | Computation complexity | Call frequency | Time |
|---|---|---|---|
| GCD | 3I + 23m | 3I + 9M | 3t (I) + 9t (M) |
| q(x) | 15m | 4M | 4t(M) |
| $a_4(x)$ | I + 20m | I + 6M | t (I) + t(M) |
| $b_4(x)$ | 17m | 5M | 5t (M) |
| $a_5(x),b_5(x)$ | 6m | 3M | 3t (M) |
| Total | 4I + 81m | 4I + 27M | 4t (I) + 22t (M) |

TABLE 2

| Calculation | Computation complexity | Call frequency | Time |
|---|---|---|---|
| q(x) | 3m | 2M | 0 |
| $a_4(x)$ | I + 2m | I + M | t (I) + t (M) |
| $b_4(x)$ | 8m | 2M | 2t (M) |
| $a_5(x),b_5(x)$ | 6m | 3M | 3t (M) |
| Total | I + 19m | I + 8M | t (I) + 6t (M) |

Moreover, in Table 1 and Table 2, t(I) represents the time for computing the multiplicative inverse and t(M) represents the time for computing multiplication. Also, $2^n$ multiplication is disregarded as executable in one clock cycle.

In Table 1 (addition), it is assumed to be t(I)>5t(M). This makes it possible, while computing $a_4(x)$, to simultaneously compute the multiplicative inverse for rendering $a_4(x)$ monic. Furthermore, in Table 2 (doubling arithmetic), it is assumed to be t(I)>2t(M). This makes it possible to concurrently compute q(x) and compute the multiplicative inverse for rendering $a_4(x)$ monic.

t(I)=8t(M) holds on $GF(2^{59})$ by the method described in "A Fast Algorithm for Computing Multiplicative Inverse in GF(2m) Using Normal Bases," T. Itoh, S. Tsujii, Inform. and Comput., vol. 83, No. 1, pp. 171–177, (1989) (hereafter referred to as the Itoh-Tsujii method), and if this is used for Table 1 and Table 2, computation complexity is 113m and time is 54t(M) in the case of an ordinary addition. And computation complexity is 27m and time is 14t(M) in the case of doubling arithmetic. On the other hand, the results obtained from "Construction and Implementation of a Secure Hyperelliptic Curve. Cryptosystems," Yasuyuki Sakai, Yuichi Ishizuka and Kouichi Sakurai, SCIS'98–10.1.B, January, 1998 (hereafter referred to Reference 1) is as shown in Table 3.

TABLE 3

|        | Addition       |                                    | Doubling arithmetic |                                    |
|--------|----------------|------------------------------------|---------------------|------------------------------------|
|        | Multiplication | Multiplicative inverse computation | Multiplication      | Multiplicative inverse computation |
| g = 0  | 3              | 1                                  | 3                   | 1                                  |
| g = 3  | 401            | 0                                  | 265                 | 0                                  |
| g = 11 | 17477          | 0                                  | 10437               | 0                                  |

If Table 3 is compared with Table 1 and Table 2, the algorithm of the present invention is 3.5 times better in computation complexity and 7 times better in time in the case of an ordinary addition, and 10 times better in computation complexity and 19 times better in time in the case of doubling arithmetic. Also, efficiency of seven multipliers is 0.572 in the case of ordinary additions, and 0.45 in the case of doubling arithmetic. Accordingly, in the algorithm of the present invention, calculation is performed more efficiently and there is a higher degree of parallelism compared with conventional techniques.

[Evaluation of Processing Performance]

Table 4 shows calculation of time necessary for integer multiplication of 160 bits or so based on Tables 1 and 2. Moreover, it is assumed that doubling arithmetic is performed 160 times and additions 80 times.

TABLE 4

| | Clock required for multiplying once | | |
|---|---|---|---|
| Operating frequency | Case A t (M) = 59clock | Case B t (M) = 8clock | Case C t (M) = 1clock |
| 20MHz | 19.35ms | 2.624ms | 0.328ms |
| 40MHz | 9.68ms  | 1.312ms | 0.164ms |
| 80MHz | 4.84ms  | 0.656ms | 0.082ms |

On the other hand, in the implementation by software of Reference 1, Alpha 21164 (250 MHz) (Alpha is a trademark of Digital Equipment Corp.) was used and processing time required was 500 μs for an addition, 50 μs for doubling arithmetic and 118 ms for integer multiplication of 160 bits. Compared with this result, hardware implementation of the algorithm of the present invention performs processing, at operating frequency of 20 MHz, 5 times faster in Case A, 50 times faster in Case B, and 360 times faster in Case C. Considering that the ratio of processing time for calculation by dedicated hardware to calculation by a general MPU with about 10 times different operating frequency in the RSA cipher is 5 times or so, it can be said that a hyperelliptic curve cryptosystems and the algorithm of the present invention are fairly suited for hardware implementation.

In addition, as regards the 160-bit-key elliptic curve cryptosystem which is considered equal in security, it is reported that it takes time of maximum 3.6 ms to sign at operating frequency of 20 MHz according to Technical Bulletin, NIKKEI ELECTRONICS, Mar. 23, 1998, (No. 712) pp. 23, and also that it takes average processing time of 60 ms for 27K-gate hardware at operating frequency of 20 MHz according to "Prototyping Hyperelliptic Curve Cryptosystem Chip," Naoya Torii, Souichi Okada, Takayuki Hasebe, Singaku Society Univ., A-7-1, October, 1998. Compared with these, the proposed algorithm performs processing equally or several times faster.

Here, an elliptic curve cryptosystem (g=1) and a hyperelliptic curve cryptosystem (an arbitrary g which is g>1) are compared as to processing performance and power consumption. Calculation of a hyperelliptic curve cryptosystem is complicated compared with an elliptic curve cryptosystem. However, Galois field of approximately 1/g can be used. Generally, if a descriptor is $GF(2^n)$, hardware volume of a multiplier as well as power consumption is in proportion to the square of n, and calculation speed is in proportion to $1/\{1-(\log_n g)\}$. Accordingly, the dependence of a multiplier's performance on genus is $g^4\{1+\log_n g+(\log_n g)^2+ \ldots \}$. On the other hand, increase in computation complexity is in proportion to $g^3$. Thus, asymptotically, a hyperelliptic curve cryptosystem is more advantageous by $g\{1+\log_n g+ \ldots \}$. Also, from the viewpoint of hardware implementation, it is an advantage that a hyperelliptic curve cryptosystem can implement g-times parallelism.

[Evaluation in the Case of Mapping to a Gate Array]

In the above explanation, t(M) and the number of multiplication were used for evaluation. To know maximum operating frequency, circuit design must be concretely performed and mapping must be performed to semiconductor technology. So, as to Case B of Table 4 where a multiplier calculates with 8-clock, a case where it was designed by using VHDL (IEEE std 1076-1987) and mapped to CMOS gate array technology (IBM CMOS 5SE) of effective channel length Leff=0.27 μm was evaluated. Consequently, the results of maximum delay between registers of 12 ns (corresponding to maximum operating frequency of 83 MHz) and hardware size of approximately 140K cells were obtained. Each block size is indicated in Table 5.

TABLE 5

| Block in FIG. 1 | Size (cells) | |
|---|---|---|
| Multiplier | 34265 cells | 7 multipliers |
| Squaring | 1344 cells | 3 squaring operators |
| Inverter | 27414 cells | |
| Register group | 18408 cells | |
| Controller | 9749 cells | 26 59-bit registers (including 12 coefficients) |
| Selector 1 | 37140 cells | |
| Selector 2 | 17402 cells | |
| Total | 145722 cells | |

Moreover, the total number of 140K cells was implemented by optimizing timing of the total circuit after connecting each block to reduce approximately 5K cells. These operating frequency and size are sufficiently practical numbers compared with encrypted VLSI such as the RSA. Moreover, as a primitive polynomial of $GF(2^{59})$, $p(x)= x^{59}+x^6+x^5+x^4+x^3+x+1$ was used. The reason is that optimal normal bases (among normal bases of $GF(2^n)$, those which can represent a multiplication result of 1 bit as a sum of 2n−1 terms) do not exist in $GF(2^{59})$, and a cyclotomic field only exists in an even-numbered extension field when a base field is GF(2).

What is claimed is:

1. A cryptographic apparatus for computing the sum of a divisor $D_1$=g.c.d. $((a_1(x)), (y-b_1(x)))$ and a divisor $D_2$=g.c.d.

$((a_2(x)), (y-b_2(x)))$ on Jacobian of a hyperelliptic curve $y^2+y=f(x)$ defined over $GF(2^n)$, said apparatus comprising:

a storage for storing $a_1(x)$, $a_2(x)$, $b_1(x)$ and $b_2(x)$;

means for calculating $q(x)=\{s_1(x) \ (b_1(x)+b_2(x))\}$ mod $a_2(x)$ or $q(x)=\{s_2(x) \ (b_1(x)+b_2(x))\}$ mod $a_1(x)$ by using $s_1(x)$ or $s_2(x)$ in $s_1(x)a_1(x)+s_2(x)a_2(x)=1$ in case of $GCD(a_1(x)), a_2(x))=1$ where GCD denotes a greatest common divisor of two polynomials; and means responsive to said means for calculating for permitting or denying access to a secure environment.

2. A cryptographic apparatus for calculating $a'(x)$ and $b'(x)$ of a reduced divisor $D'=g.c.d.\ ((a'(x)), (y-b'(x)))$ which is a linearly equivalent to $D_1+D_2$ for a divisor $D_1=g.c.d.\ ((a_1(x)), (y-b_1(x)))$ and a divisor $D_2=g.c.d.\ ((a_2(x)), (y-b_2(x)))$ on Jacobian of a hyperelliptic curve $y^2+y=f(x)$ defined over $GF(2^n)$, said appratus comprising:

means for calculating $q(x)=s_1(x) \ (b_1(x)+b_2(x))$ mod $a_2(x)$ by using $s_1(x)$ in $s_1(x)a_1(x)+s_2(x)a_2(x)=1$ in case of $GCD(a_1(x), a_2(x))=1$ where GCD denotes a greatest common divisor of two polynomials;

means for calculating $\alpha(x)=Q(q_2(x)a_1(x), a_2(x))+Q(f(x), a_1(x)a_2(x))$ which is rendered a monic polynomial where $Q(A,B)$ is a quotient of $A/B$;

means for calculating $\beta(x)=(q(x)a_1(x)+b_1(x)+1$ mod $\alpha(x)$;

means for calculating $a'(x)=Q(f(x)+\beta_2(x), \alpha(x))$;

means for calculating $b'(x)=(\beta(x)+1)$ mod $a'(x)$; and means responsive to said last mentioned means for calculating for permitting or denying access to a secure environment.

3. A cryptographic apparatus for computing the sum of a divisor $D_1=g.c.d.\ ((a_1(x)), (y-b_1(x)))$ on Jacobian of a hyperelliptic curve $y^2+y=f(x)$ defined over $GF(2^n)$, said apparatus comprising:

a storage for storing $a_1(x)$, and $b_1(x)$;

means for calculating $q(x)=Q(b_1^2(x)+f(x)$ mod $a_1^2(x), a_1(x))$ where $Q(A,B)$ is a quotient of $A/B$; and means responsive to said means for calculating for permitting or denying access to a secure environment.

4. A cryptographic apparatus for calculating $a'(x)$ and $b'(x)$ of a reduced divisor $D'=g.c.d.\ ((a'(x)), (y-b'(x)))$ which is a linearly equivalent to $D_1+D_1$ for a divisor $D_1=g.c.d.\ ((a_1(x)), y-b_1(x)))$ on Jacobian of a hyperelliptic curve $y^2+y=f(x)$ defined over $GF(2^n)$, said apparatus comprising:

means for calculating $q(x)=Q(b_1^2(x)+f(x)$ mod $a_1^2(x), a_1(x))$ where $Q(A,B)$ is a quotient of $A/B$;

means for calculating $\alpha(x)=q_2(x)+Q(f(x), a_1^2(x))$ which is rendered a monic polynomial;

means for calculating $\beta(x)=b_1^2(x)+f(x)$ mod $a_1^2(x)+1)$ mod $\alpha(x)$;

means for calculating $a'(x)Q(f(x)+\beta_2(x), \alpha(x))$;

means for calculating $b'(x)=(\beta(x)+1$ mod $a'(x)$; and means responsive to said last mentioned means for calculating for permitting or denying access to a secure environment.

5. A computer implemented cryptographic method for calculating $a'(x)$ and $b'(x)$ of a reduced divisor $D'=g.c.d.\ ((a'(x)), (y-b'(x)))$ which is a linearly equivalent to $D_1+D_2$ for a divisor $D_1=g.c.d.\ ((a_1(x)), (y-b_1(x)))$ and a divisor $D_2=g.c.d.\ ((a_2(x)), y-b_2(x)))$ on Jacobian of a hyperelliptic curve $y^2+y=f(x)$ defined over $GF(2^n)$, said method comprising the steps of:

calculating and storing in a storage $q(x)=\{s_1(x) \ (b_1(x)+b_2(x))\}$ mod $a_2(x)$ by using $s_1(x)$ in $s_1(x)a_1(x)+s_2(x)a_2(x)=1$ in case of $GCD(a_1(x), a_2(x))=1$ where GCD denotes a greatest common divisor of two polynomials;

calculating and storing in a storage $\alpha(x)=Q(q^2(x)a_1(x), a_2(x))+Q(f(x), a_1(x)a_2(x))$ which is rendered a monic polynomial where $Q(A,B)$ is a quotient of $A/B$;

calculating and storing in a storage $\beta(x)=(q(x)a_1(x)+b_1(x)+1)$ mod $\alpha(x)$;

calculating and storing in a storage $a'(x)=Q(f(x)+\beta^2(x), \alpha(x))$;

calculating and storing in a storage $b'(x)=(\beta(x)+1)$ mod $a'(x)$; and permitting or denying access to a secure environment depending on an outcome of said calculating steps.

6. A computer implemented cryptographic method for calculating $a'(x)$ and $b'(x)$ of a reduced divisor $D'=g.c.d.\ ((a'(x)), y-b'(x)))$ which is a linearly equivalent to $D_1+D_1$ for a divisor $D_1=g.c.d.\ ((a_1(x)), (y-b_1(x)))$ on Jacobian of a hyperelliptic curve $y^2+y=f(x)$ defined over $GF(2^n)$, said method comprising the steps of:

calculating and storing in a storage $q(x)=Q(b_1^2(x)+f(x)$ mod $a_1^2(x), a_1)$ where $Q(A,B)$ is a quotient of $A/B$;

calculating and storing in a storage $\alpha(x)=q^2(x)+Q(f(x), a_1^2(x))$ which is rendered a monic polynomial;

calculating and storing in a storage $\beta(x)=(b_1^2(x)+f(x)$ mod $a_1^2(x)+1)$ mod $\alpha(x)$;

calculating and storing in a storage $a'(x)=Q(f(x)+\beta^2(x), \alpha(x))$;

calculating and storing in a storage $b'(x)=(\beta(x)+1)$ mod $a'(x)$; and permitting or denying access to a secure environment depending on an outcome of said calculating steps.

7. A computer implemented cryptographic method for computing the sum of a divisor $D_1=g.c.d.\ ((a_1(x)), (y-b_1(x)))$ and a divisor $D_2=g.c.d.\ ((a_2(x)), (y-b_2(x)))$ on Jacobian of a hyperelliptic curve $y^2+y=f(x)$ defined over $GF(2^n)$, said method comprising the steps of:

storing $a_1(x)$, $a_2(x)$, $b_1(x)$ and $b_2(x)$;

calculating and storing in a storage $q(x)=\{s_1(x) \ (b_1(x)+b_2(x))\}$ mod $a_2(x)$ or $q(x)=\{s_2(x) \ (b_1(x)+b_2(x))\}$ mod $a_1(x)$ by using $s_1(x)$ or $s_2(x)$ in $s_1(x)a_1(x)+s_2(x)a_2(x)=1$ in case of $GCD(a_1(x), a_2(x))=1$; and permitting or denying access to a secure environment depending on an outcome of said calculating step.

8. A computer implemented cryptographic method for computing the sum of a divisor $D_1=g.c.d.\ ((a_1(x)), (y-b_1(x)))$ on Jacobian of a hyperelliptic curve $y^2+y=f(x)$ defined over $GF(2^n)$, said method comprising the steps of:

storing $a_1(x)$, and $b_1(x)$;

calculating and storing in a storage $q(x)=Q(b_1^2(x)+f(x)$ mod $a_1^2(x), a_1(x))$ where $Q(A,B)$ is a quotient of $A/B$; and permitting or denying access to a secure environment depending on an outcome of said calculating step.

* * * * *